US005227271A

United States Patent [19]

Kikuchi et al.

[11] Patent Number: 5,227,271

[45] Date of Patent: Jul. 13, 1993

[54] ELECTROPHOTOGRAPHIC PHOTOSENSITIVE MEMBER

[75] Inventors: Toshihiro Kikuchi, Yokohama; Akihiro Senoo, Tokyo; Takakazu Tanaka, Machida, all of Japan

[73] Assignee: Canon Kabushiki Kaisha, Tokyo, Japan

[21] Appl. No.: 780,475

[22] Filed: Oct. 22, 1991

[30] Foreign Application Priority Data

Oct. 23, 1990 [JP] Japan ..................................... 2-286398

[51] Int. Cl.$^5$ ......................... G03G 5/06; G09B 67/50

[52] U.S. Cl. ......................................... 430/59; 430/76; 430/78; 430/135; 540/141

[58] Field of Search ......................... 430/59, 70, 72, 76, 430/77, 78, 79, 135; 540/141

[56] References Cited

U.S. PATENT DOCUMENTS

| | | | |
|---|---|---|---|
| 4,444,861 | 4/1984 | Nogami et al. | 430/58 |
| 4,664,997 | 5/1987 | Suzuki et al. | 430/58 |
| 4,725,519 | 2/1988 | Suzuki et al. | 430/58 |
| 4,728,592 | 3/1988 | Ohaku et al. | 430/59 |
| 4,853,308 | 8/1989 | Ong et al. | 430/59 |
| 4,898,799 | 2/1990 | Fujimaki et al. | 430/59 |
| 4,931,371 | 6/1990 | Matsumoto et al. | 430/59 |
| 5,024,912 | 6/1991 | Neishi et al. | 430/59 |
| 5,049,464 | 9/1991 | Kanemaru et al. | 430/59 |
| 5,079,118 | 1/1992 | Kikuchi et al. | 430/59 |
| 5,132,197 | 7/1992 | Iuchi et al. | 430/76 |

FOREIGN PATENT DOCUMENTS

| | | |
|---|---|---|
| 409737 | 1/1991 | European Pat. Off. . |
| 59-166959 | 9/1984 | Japan . |
| 63-366 | 1/1988 | Japan . |
| 63-116158 | 5/1988 | Japan . |
| 63-198067 | 8/1988 | Japan . |
| 64-17066 | 1/1989 | Japan . |

OTHER PUBLICATIONS

Patent Abstracts of Japan, vol. 10, No. 101, (P-447)[2158], Apr. 17, 1986 of JPA 60-233656, published Nov. 20, 1985.

*Primary Examiner*—John Goodrow
*Attorney, Agent, or Firm*—Fitzpatrick, Cella, Harper & Scinto

[57] ABSTRACT

An electrophotographic photosensitive member, comprising: an electroconductive support and a photosensitive layer disposed on the electroconductive support, wherein the photosensitive layer comprises (i) oxytitanium phthalocyanine having a crystal form characterized by main peaks specified by Bragg angles ($2\theta \pm 0.2$ degree) of 9.0 degrees, 14.2 degrees, 23.9 degrees and 27.1 degrees in X-ray diffraction pattern based on CuK$\alpha$ characteristic X-rays, and (ii) a fluorene compound represented by the following formula (I):

(I)

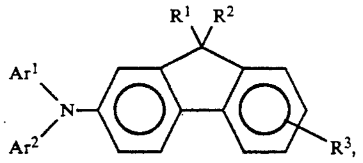

wherein $Ar^1$ and $Ar^2$ independently denote aryl group optionally having a substituent; $R^1$ and $R^2$ independently denote alkyl group optionally having a substituent, aralkyl group optionally having a substituent or aryl group optionally having a substituent; and $R^3$ denotes hydrogen atom, alkyl group optionally having a substituent, alkoxy group optionally having a substituent, hydroxyl group or halogen atom.

16 Claims, 11 Drawing Sheets

ELECTROPHOTOGRAPHIC PHOTOSENSITIVE MEMBER

FIELD OF THE INVENTION AND RELATED ART

The present invention relates to an electrophotosensitive (or electrophotographic photosensitive) member providing improved electrophotographic characteristics, particularly to an electrophotosensitive member comprising a photosensitive layer containing a particular charge-generating material and a particular charge-transporting material.

In organic electrophotosensitive members comprising a photosensitive layer containing an organic photoconductor, there have been used so-called function separation-type electrophotosensitive members containing a charge-generating material and a charge-transporting material in many cases. The function separation-type electrophotosensitive members have provided remarkably improved electrophotographic characteristics such as a high sensitivity and an excellent durability which have not been accomplished by the conventional organic electrophotosensitive members. The function separation-type electrophotosensitive members also have an advantage of wide latitude in material selection from the charge-generating materials and the charge-transporting materials, respectively. As a result, electrophotosensitive members having arbitrary characteristics can easily be prepared in many cases.

On the other hand, the electrophotosensitive members have recently been used for not only copying machines but also non-impact type printers adopting electrophotography with considerable frequency. These printers are laser beam printers using lasers as light sources in general. As the light sources, semiconductor lasers are used in view of cost, apparatus size, etc. The semiconductor lasers have relatively long wavelengths (i.e., emission wavelengths: 790±20 nm), so that electrophotosensitive members having sufficient sensitivity for laser light having the long wavelengths have been developed. The sensitivity of an electrophotosensitive member varies depending on a species of a charge-generating material. There have been known many representative charge-generating materials such as phthalocyanine pigments, azo pigments, cyanine dyes, azulenium dyes and squarium dyes.

There have been studied many charge-generating materials having sensitivity for long-wavelength light, which include metallic phthalocyanine compounds such as chloro-aluminum phthalocyanine, chloroindium phthalocyanine, oxyvanadium phthalocyanine, chlorogallium phthalocyanine, magnesium phthalocyanine and oxytitanium phthalocyanine; and non-metallic phthalocyanine compounds.

For many phthalocyanine compounds among these, various crystal forms have been known. It is generally known, for example, that non-metallic phthalocyanine compounds of α-type, β-type, γ-type, δ-type, ε-type, χ-type, τ-type, etc. and copper phthalocyanine of α-type, β-type, γ-type, δ-type, ε-type, χ-type, etc. exist. Further, it is also generally known that the difference in crystal form exerts great influence on electrophotographic characteristics (i.e., sensitivity, potential stability in durability test, etc.) and paint characteristics when the phthalocyanine compounds are used in paint.

Many different crystal forms of oxytitanium phthalocyanine having high sensitivity for the long-wavelength light in particular have been known similarly as in the above non-metallic phthalocyanine compounds and copper phthalocyanine, including those disclosed in Japanese Laid-Open Patent Application (KOKAI) Nos. 49544/1984 (U.S. Pat. No. 4,444,861), 166959/1984, 239248/1986 (U.S. Pat. No. 4,728,592), 67094/1987 (U.S. Pat. No. 4,664,997), 366/1988, 116158/1988, 198067/1988 and 17066/1989.

In a practical use, however, the above-mentioned oxytitanium phthalocyanine compounds have some drawbacks such as insufficient sensitivity, poor potential stability in a durability test, poor chargeability and deterioration in image quality due to charge in environmental conditions used. As a result, there has not been obtained a satisfactory oxytitanium phthalocyanine compound free from the above drawbacks.

Generally speaking, a useful charge-transporting material for a practical photosensitive member in combination with a particular charge-generating material is not always effective in combination with other charge-generating materials. On the other hand, a useful charge-generating material for a practical photosensitive member in combination with a particular charge-transporting material is not always effective in combination with other charge-transporting materials. In other words, between the charge-generating materials and charge-transporting materials which contribute to charge delivery, a preferred combination necessarily exists. When the preferred combination of a charge-generating material and charge-transporting material is employed, there can be obtained practical photosensitive member excellent in electrophotographic characteristics such as residual potential and potential stability in repetitive use.

However, there has not been found a general rule with respect to the compatibility of the charge-generating materials with the charge-transporting materials. Accordingly, it is very difficult to find a charge-transporting material suitable for a particular charge-generating material under the present situation.

SUMMARY OF THE INVENTION

An object of the present invention is to provide an electrophotographic photosensitive member having high photosensitivity for long-wavelength light.

Another object of the present invention is to provide an electrophotographic photosensitive member which has excellent stability of electric potential when used in a durability test and provides a stable electric potential characteristic and good image characteristic when used under various environmental conditions including temperature and humidity.

According to the present invention, there is provided an electrophotographic photosensitive member comprising an electroconductive support and a photosensitive layer formed thereon, wherein the photosensitive layer comprises (i) oxytitanium phthalocyanine having a crystal form characterized by main peaks specified by Bragg angles (2θ±0.2 degree) of 9.0 degrees, 14.2 degrees, 23.9 degrees and 27.1 degrees in X-ray diffraction pattern based on CuKα characteristic X-rays, and (ii) a fluorene compound represented by the following formula (I):

(I)

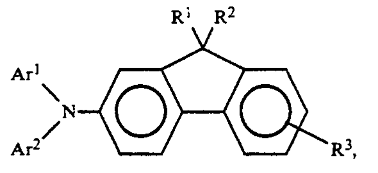

wherein $Ar^1$ and $Ar^2$ independently denote aryl group optionally having a substituent; $R^1$ and $R^2$ independently denote alkyl group optionally having a substituent, aralkyl group optionally having a substituent or aryl group optionally having a substituent; and $R^3$ denotes hydrogen atom, alkyl group optionally having a substituent, alkoxy group optionally having a substituent, hydroxyl group or halogen atom.

According to the present invention, there is further provided an electrophotographic apparatus, including an electrophotographic photosensitive member described above, means for forming an electrostatic latent image, means for developing the formed electrostatic latent image and means for transferring the developed image to a transfer-receiving material.

According to the present invention, there is still further provided device unit, including: an electrophotographic photosensitive member described above, a charging means and a cleaning means; wherein the photosensitive member, the charging means and the cleaning means are integrally supported to form a single unit, which can be connected to or released from an apparatus body as desired.

According to the present invention, there is provided a facsimile machine, comprising: an electrophotographic apparatus and means for receiving image data from a remote terminal, the electrophotographic apparatus including an electrophotographic photosensitive member described above.

These and other objects, features and advantages of the present invention will become more apparent upon a consideration of the following description of the preferred embodiments of the present invention taken in conjunction with the accompanying drawings.

DETAILED DESCRIPTION OF THE INVENTION

Figure 1:
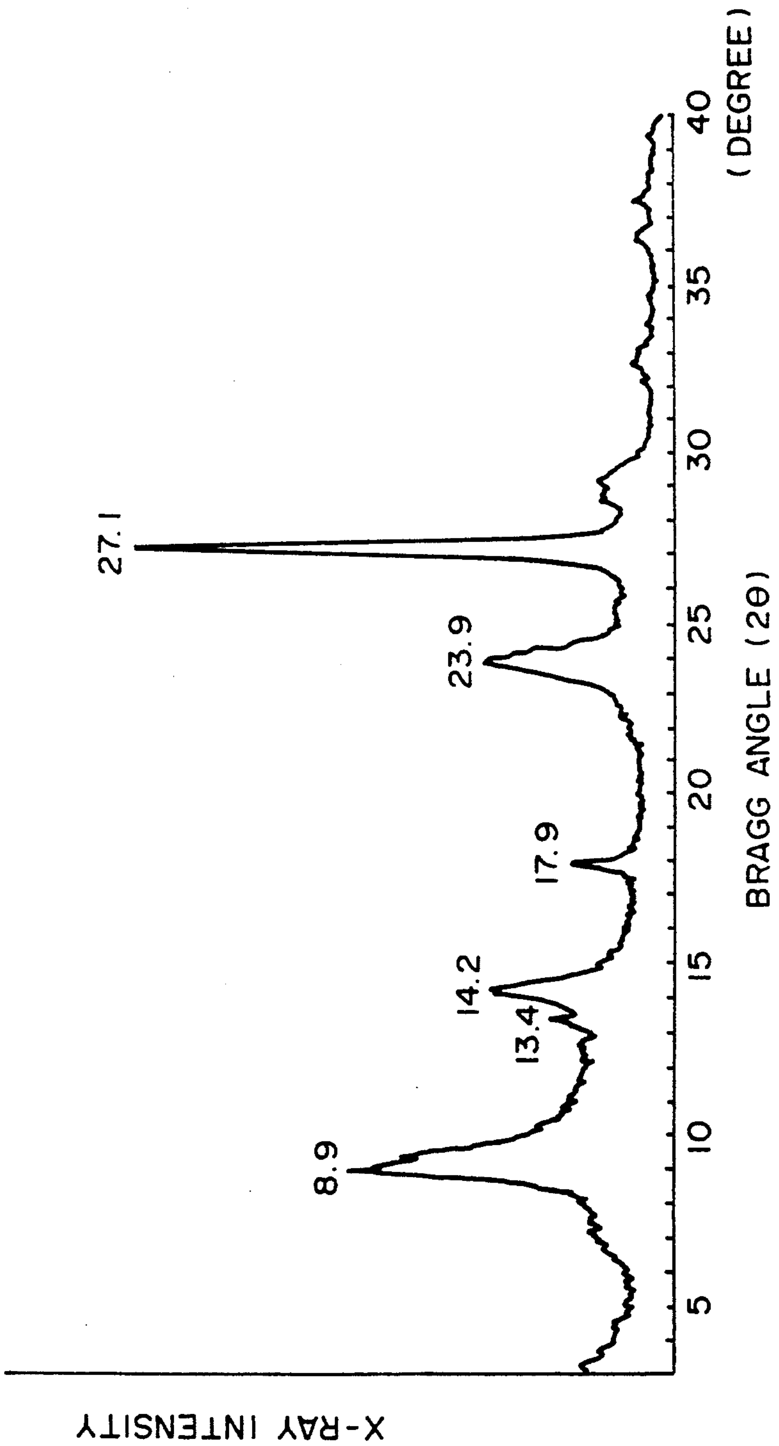
FIGS. 1-3 are graphs showing X-ray diffraction patterns of three types of oxytitanium phthalocyanine having a crystal form used in the invention each prepared in Synthesis Examples 1-3.
Figure 2:
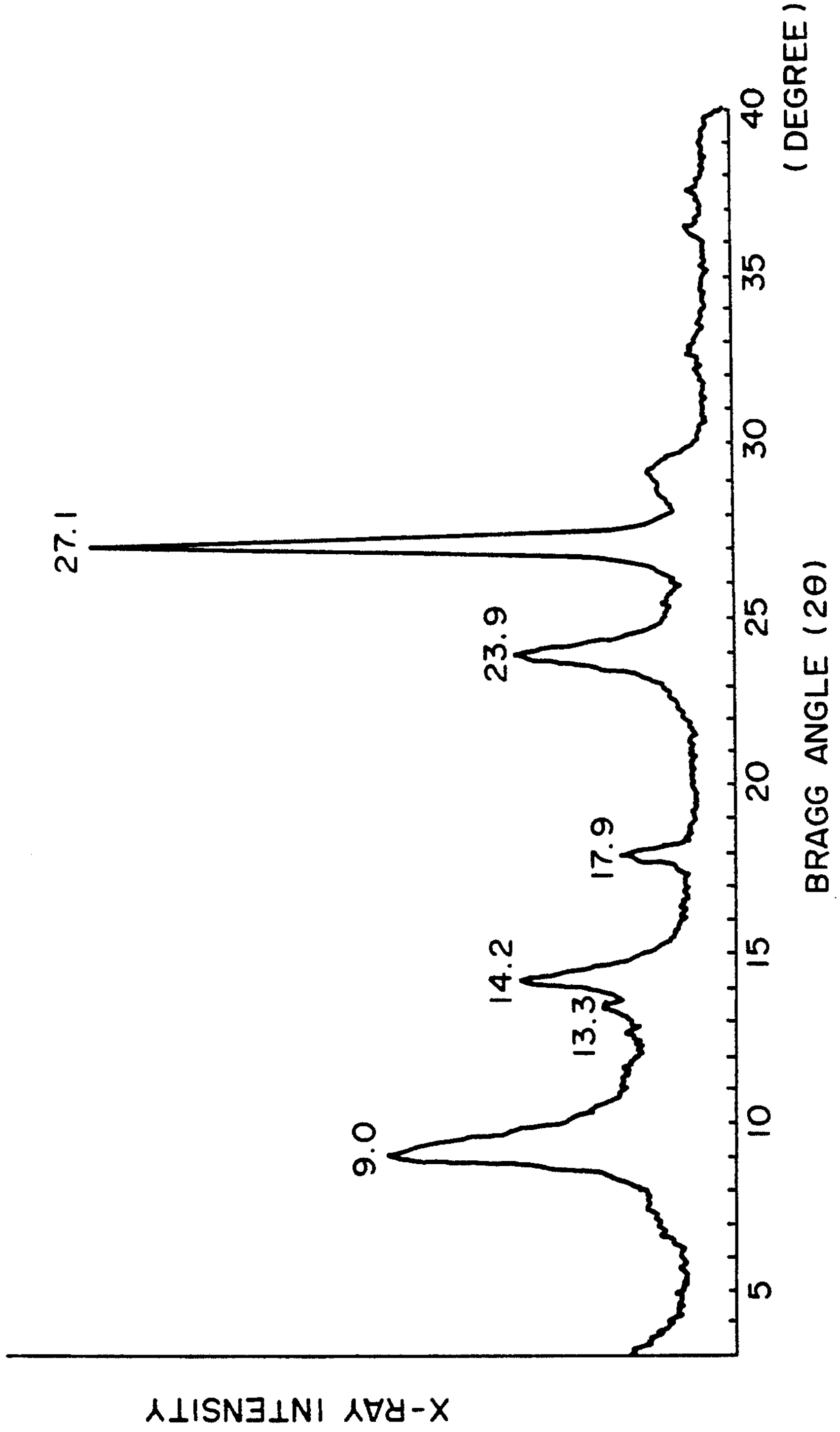
Figure 3:
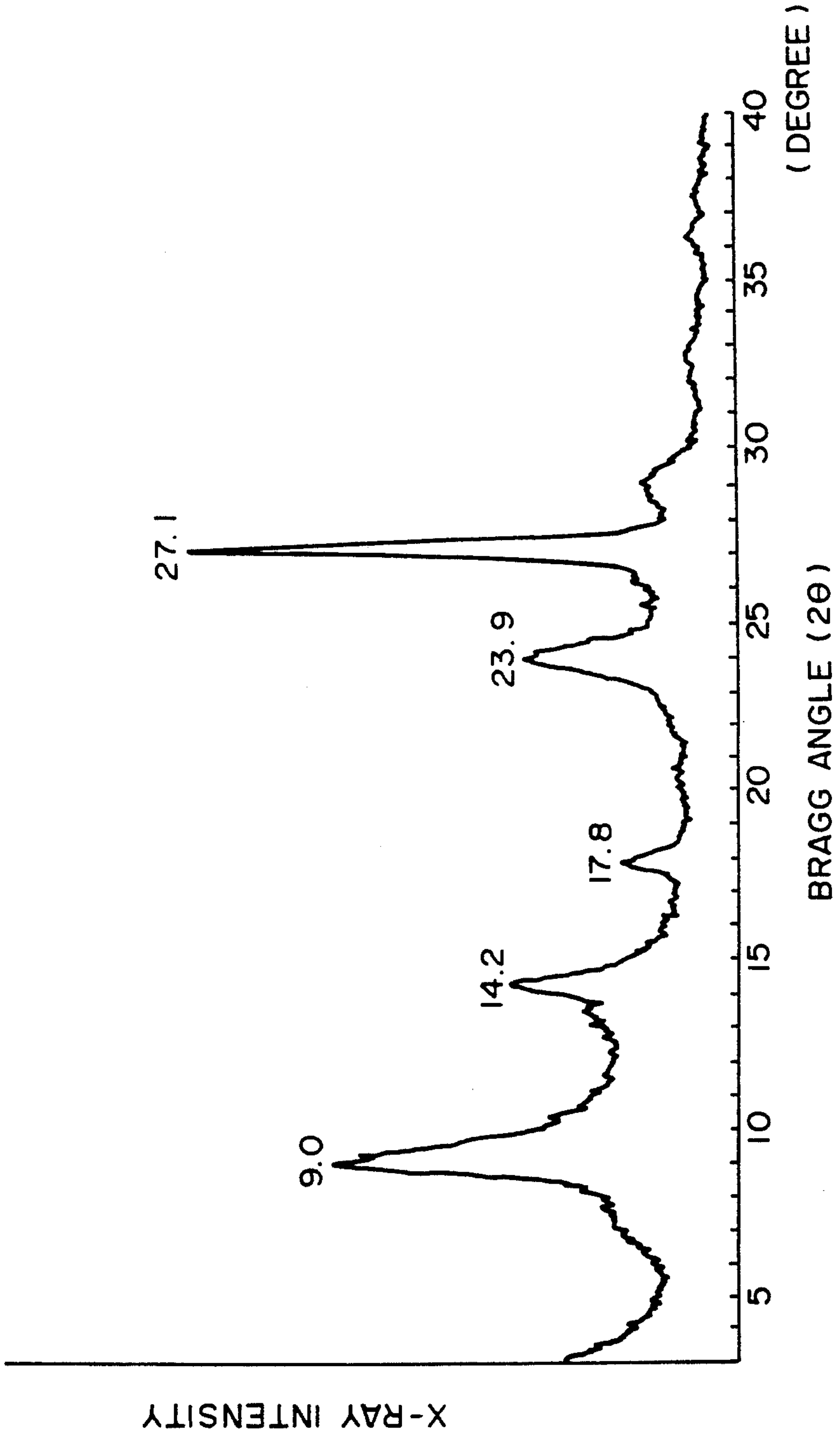

In X-ray diffraction patterns of three types of oxytitanium phthalocyanine used in the invention as shown in FIGS. 1-3, strong peaks are observed at specific Bragg angles ($2\theta\pm0.2$ degree) of 9.0 degrees, 14.2 degrees, 23.9 degrees and 27.1 degrees. The above peaks are selected in order of peak intensity by taking the highest four peaks as main peaks.

Referring to FIGS. 1-3, among the above four peaks, the peak of 27.1 degrees is the first strongest peak and the peak of 9.0 degrees is the second strongest peak. The above four peaks are followed by the peaks of 17.9 degrees and 13.3 degrees. Further, there are no clear peaks observed in the range of 10.5-13.0 degrees, 14.8-17.4 degrees or 18.2-23.2 degrees.

The shapes of the peaks in the X-ray diffraction pattern of the invention can be slightly changed depending on the production or measuring conditions, so that the tip of each peak can split. In FIG. 1, the peak of 8.9 degrees appears to split into two peaks of 8.9 degrees and about 9.4 degrees, and the peak of 14.2 degrees also appears to split into two peaks of 14.2 degrees and about 14.1 degrees.

The structural formula of oxytitanium phthalocyanine used in the present invention is represented by the following formula:

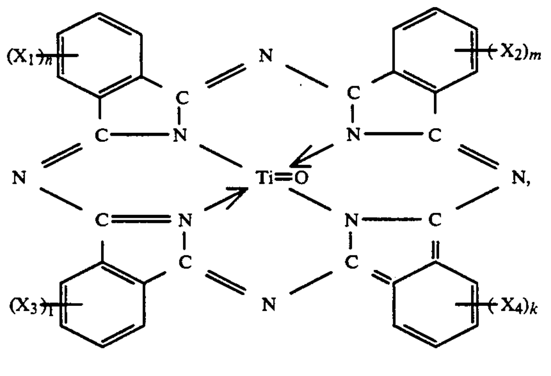

wherein $X_1$, $X_2$, $X_3$ and $X_4$ respectively denote Cl or Br; and n, m, l and k are respectively an integer of 0-4.

In the fluorene compound of the formula (I) used in the invention, examples of aryl group may include phenyl, naphthyl and pyridyl.

Examples of alkyl group may include methyl, ethyl and propyl.

Examples of alkoxy group may include methoxy and ethoxy.

Examples of aralkyl group may include benzyl and phenethyl.

Examples of a halogen atom may include fluorine, chlorine and bromine.

Examples of a substituent may include alkyl group, alkoxy group, aryl group, halogen atom and hydroxyl group.

In the fluorene compound of the formula (I) used in the present invention, $Ar^1$ and $Ar^2$ may preferably include 4-methylphenyl group, respectively.

Preferred examples of $R^1$ and $R^2$ may independently include methyl group and ethyl group.

Specific and non-exhaustive examples of the fluorene compound represented by the formula (I) may include those shown by the following structural formulas.
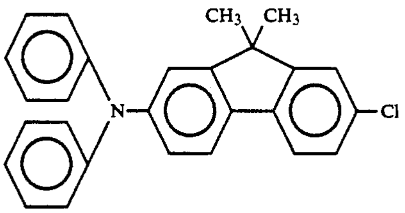
(1)
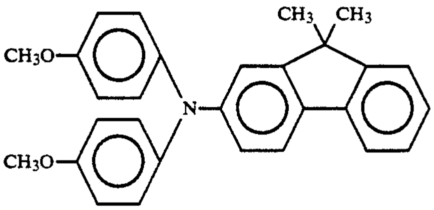
(2)
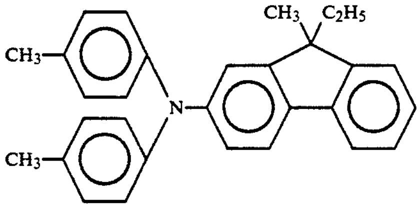
(3)
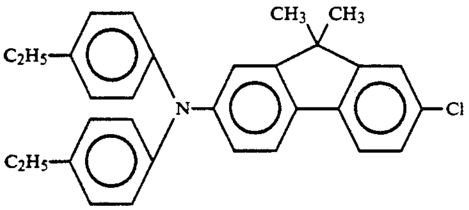
(4)
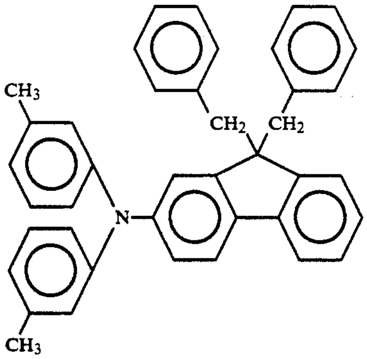
(5)
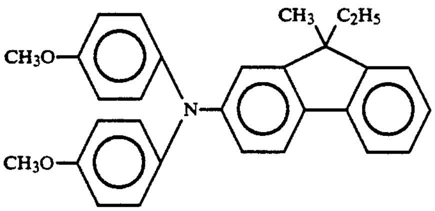
(6)
-continued
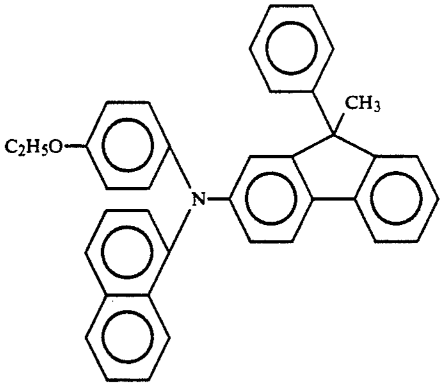
(7)
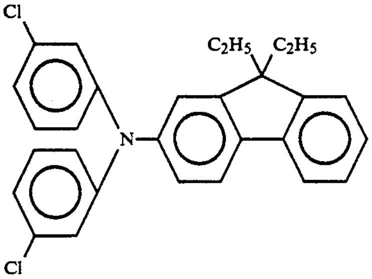
(8)
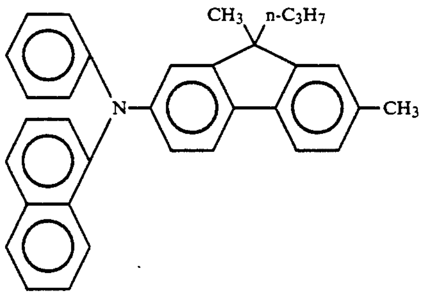
(9)
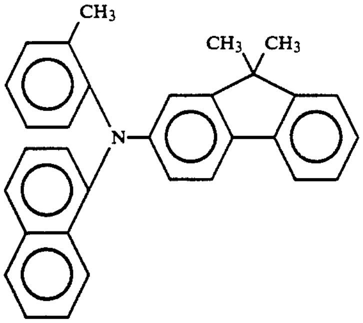
(10)
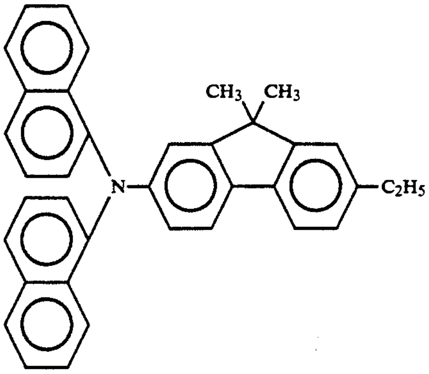
(11)

-continued
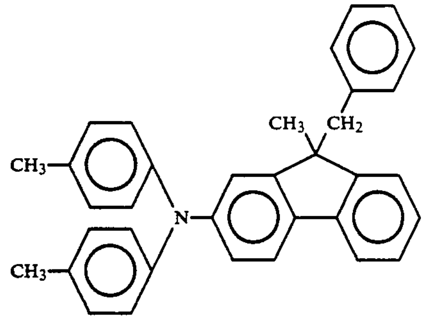
(12)
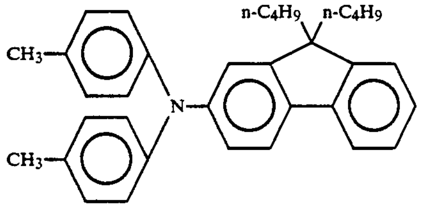
(13)
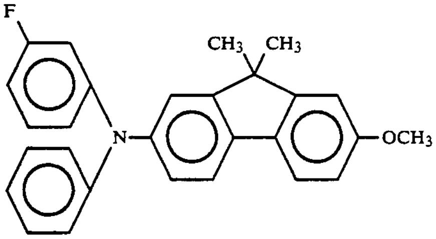
(14)
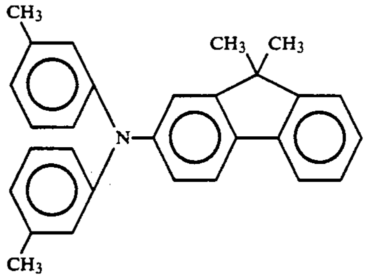
(15)
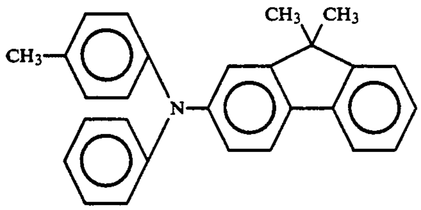
(16)
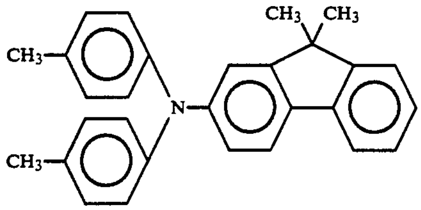
(17)
-continued
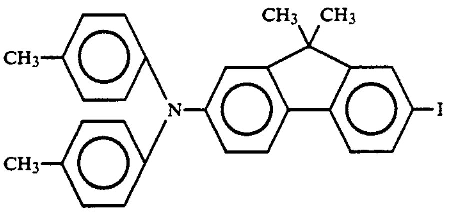
(18)
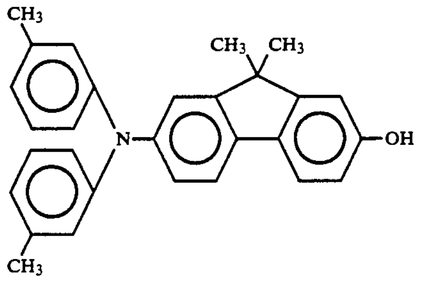
(19)
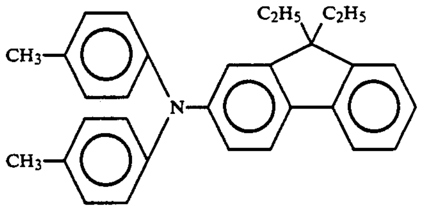
(20)
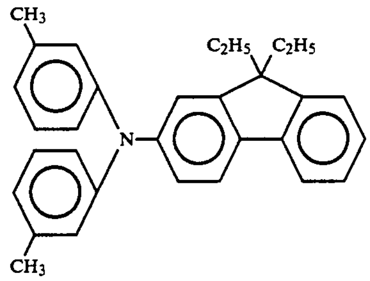
(20)
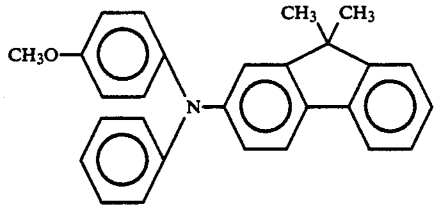
(22)
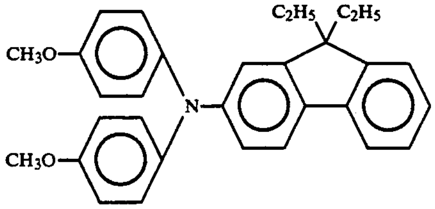
(23)

-continued
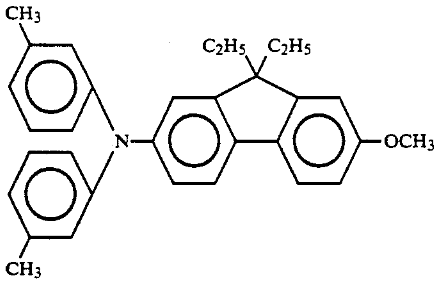
(24)
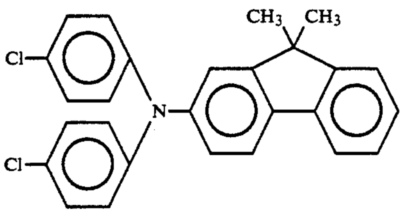
(25)
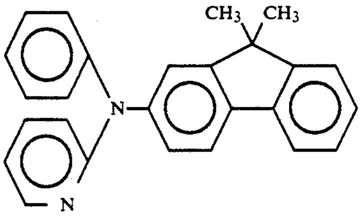
(26)
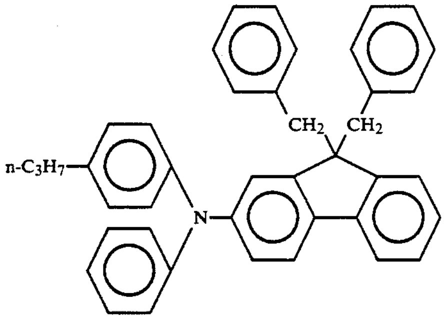
(27)
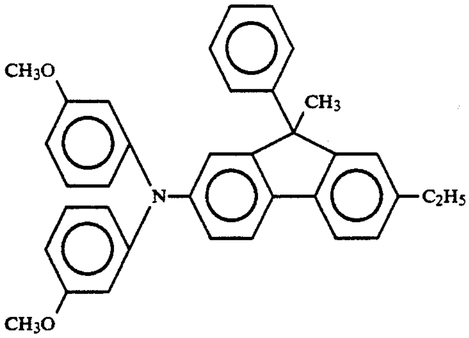
(28)
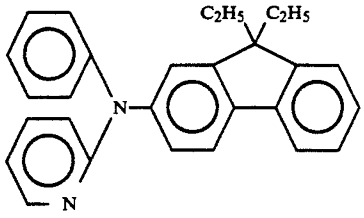
(29)
-continued
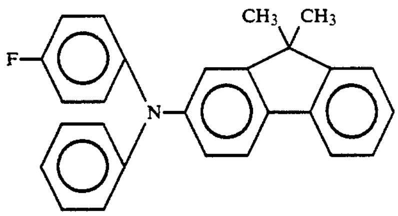
(30)
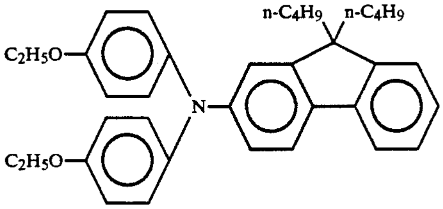
(31)
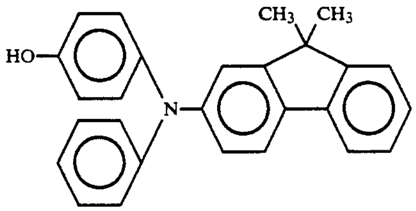
(32)
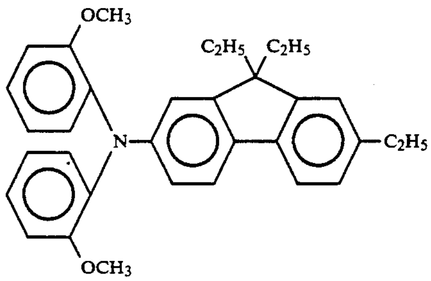
(33)
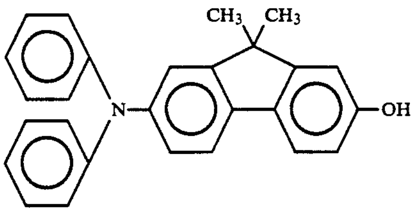
(34)
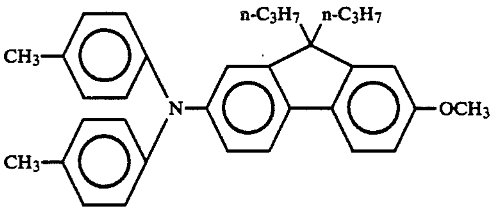
(35)
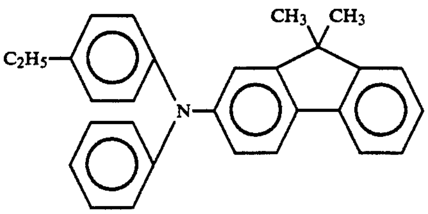
(36)

-continued
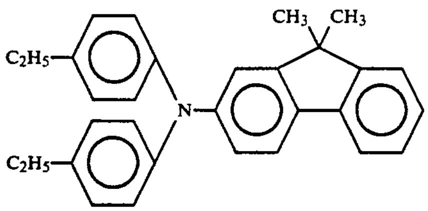
(37)
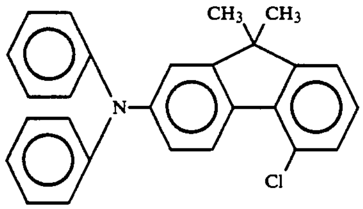
(38)
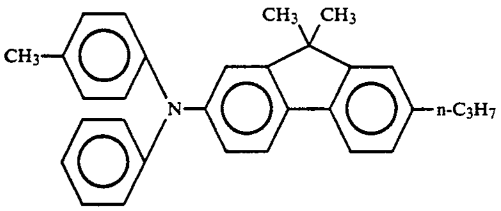
(39)
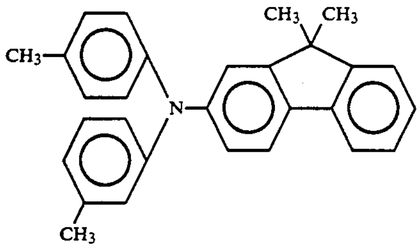
(40)
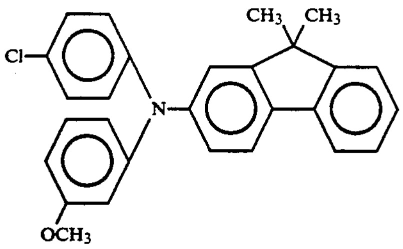
(41)
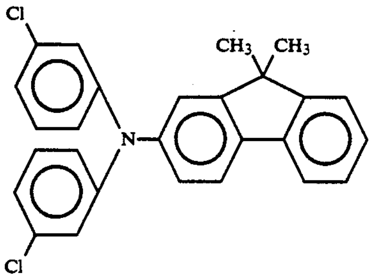
(42)
-continued
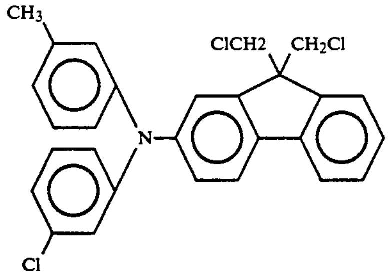
(43)
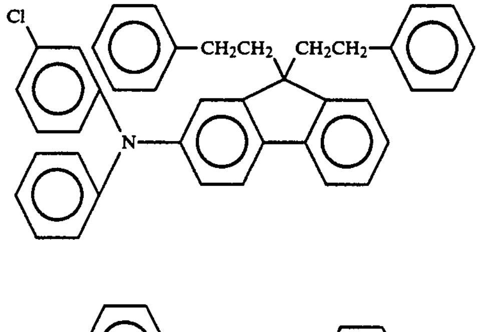
(44)
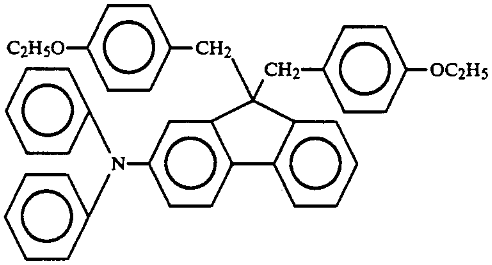
(45)
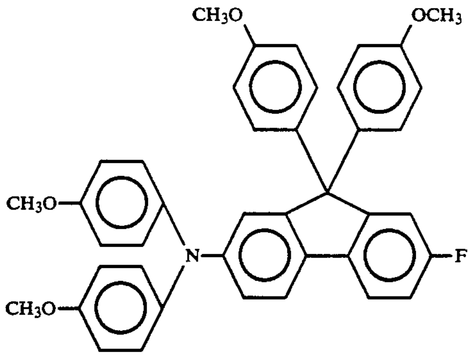
(46)
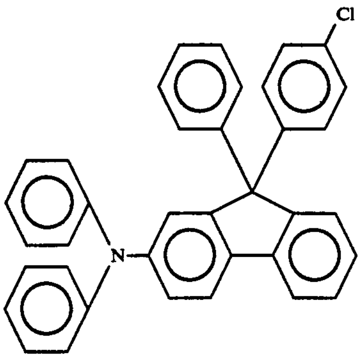
(47)

-continued (48)

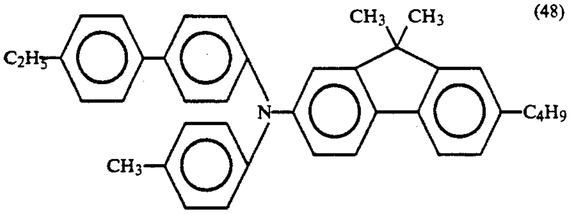

(49)

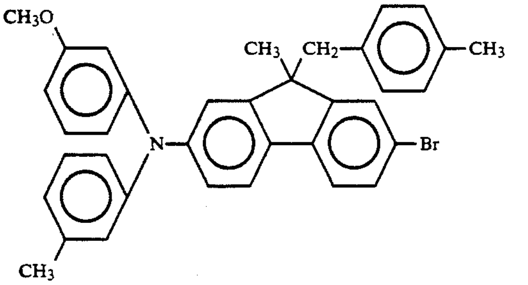

(50)

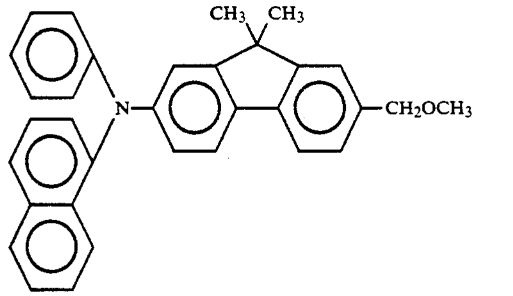

(51)

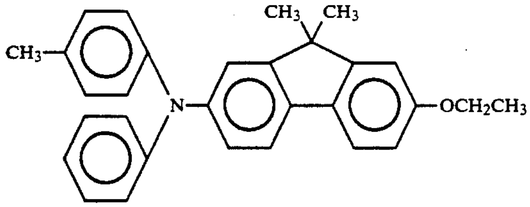

(52)

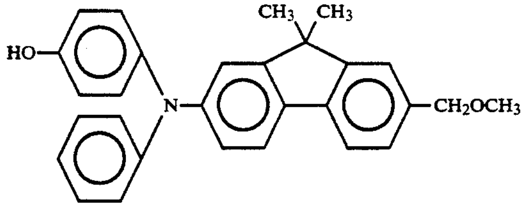

(53)

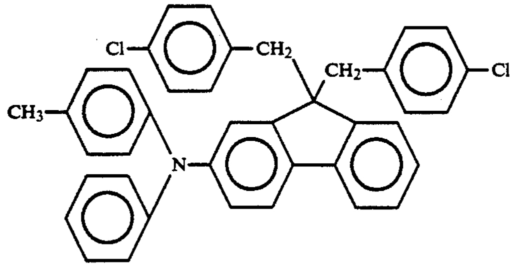

-continued (54)

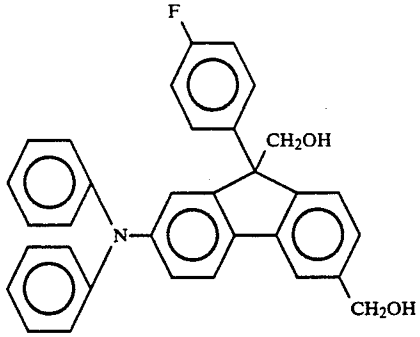

Though it is not clear why the combination of the oxytitanium phthalocyanine having a specific crystal form and the fluorene compound of the formula (I) described above is effective for providing a practical photosensitive member according to the present invention, it is presumable that ionization potentials of the oxytitanium phthalocyanine used as a charge-generating material and the fluorene compound used as a charge-transporting material are compatible each other or that the oxytitanium phthalocyanine and the fluorene compound exhibit a better stereo structural superposition at the surface thereof. As a result, a charge injection from the charge-generating material to the charge-transporting material is effectively and smoothly conducted, whereby the photosensitive member of the invention provides good electrophotographic characteristics such as a high photosensitivity, a decreased residual potential and an excellent potential stability in repetitive use.

A representative example of the process for producing oxytitanium phthalocyanine having a specific crystal form used in the invention is described below.

Titanium tetrachloride is reacted with o-phthalodinitrile in α-chloronaphthalene to provide dichlorotitanium phthalocyanine. The resultant dichlorotitanium phthalocyanine is washed with a solvent such as α-chloronaphthalene, trichlorobenzene, dichlorobenzene, N-methylpyrrolidone or N,N-dimethylformamide and is further washed with a solvent such as methanol or ethanol, followed by hydrolysis with hot water to obtain an oxytitanium phthalocyanine crystal. The resultant crystal comprises a mixture of various crystal forms in most cases. According to the present invention, the resultant crystal is treated by acid pasting (i.e., a method of dissolving the mixture in acid (e.g., sulfuric acid) and pouring the resultant solution into water to reprecipitate a solid in the form of a paste), whereby the resultant crystal is once converted into amorphous oxytitanium phthalocyanine. The resultant amorphous oxytitanium phthalocyanine is subjected to methanol treatment for 30 minutes or more, preferably 1 hour or more, at room temperature or under heating or boiling, followed by drying under reduced pressure. The treated oxytitanium phthalocyanine is subjected to milling for 5 hours or more, preferably 10 hours or more, with a solvent, as a dispersion medium, selected from: ethers, such as n-propyl ether, n-butyl ether, isobutyl ether, sec-butyl ether, n-amyl ether, n-butyl methyl ether, n-butyl ethyl ether or ethylene glycol n-butyl ether; monoterpene hydrocarbons, such as terpinolene or pinene; and liquid paraffins, to provide oxytitanium phthalocyanine having a specific crystal form used in the present invention.

In the above process, the methanol treatment may for example be performed by treating the amorphous oxytitanium phthalocyanine in the form of a dispersion in methanol under stirring, and the milling may be performed by using a milling device such as a sand mill or a ball mill with milling media such as glass beads, steel beads or alumina balls.

Hereinafter, some examples of application of the oxytitanium phthalocyanine crystal and the fluorene compound used in an electrophotosensitive member of the invention will be explained.

Figure 10:
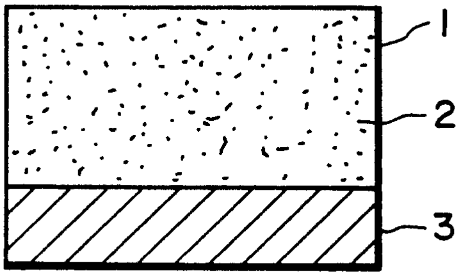
FIGS. 10 and 11 are schematic sectional views of laminar structure of electrophotosensitive members of the invention.
Figure 11:
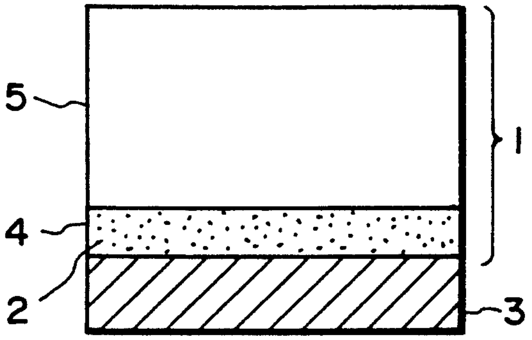

Representative embodiments of laminar structure of the electrophotosensitive member of the invention as shown in FIGS. 10 and 11.

FIG. 10 shows an embodiment, wherein a photosensitive layer 1 is composed of a single layer and comprises a charge-generating material 2 and a charge-transporting material (not shown) together. The photosensitive layer 1 may be disposed on an electroconductive support 3.

FIG. 11 shows an embodiment of laminated structure wherein a photosensitive layer 1 comprises a charge generation layer 4 comprising a charge-generating material 2 and a charge transport layer 5 comprising a charge-transporting material (not shown) disposed on the charge generation layer 4; and the charge transport layer 5 may be disposed on an electroconductive support 3. The charge generation layer 4 and the charge transport layer 5 can be disposed in reverse.

In production of the electrophotosensitive member, the electroconductive support 3 may be a material having an electroconductivity including: a metal such as aluminum or stainless steel; and metal, plastic or paper having an electroconductive layer.

Between the electroconductive support 3 and the photosensitive layer 1, there can be formed a primer or undercoating layer having a barrier function and an adhesive function as an intermediate layer. The undercoating layer may comprise a substance, such as vinyl copolymers, polyvinyl alcohol, polyethylene oxide, ethyl cellulose, methyl cellulose, casein, polyamide, glue or gelatin. The above substance may be dissolved in an appropriate solvent and applied onto the electroconductive support 3 to prepare the primer layer. The thickness of the primer layer may be 0.2–3.0 microns.

The photosensitive layer which is composed of a single layer as shown in FIG. 10 may be formed by mixing the charge-generating material comprising the oxytitanium phthalocyanine crystal used in the invention and the charge-transporting material with an appropriate solution containing a binder resin, applying the resultant coating liquid and then drying the coating.

The charge generation layer of the photosensitive layer having a laminated structure as shown in FIG. 11 may be formed by dispersing the charge-generating material comprising the oxytitanium phthalocyanine crystal used in the invention in an appropriate solution containing a binder resin, applying the resultant coating liquid and then drying the coating. It is possible not to use the binder resin in the above solution. The charge generation layer may also be formed by vapor deposition. Examples of the binder resin as described above may include: polyester, acrylic resins, polyvinylcarbazole, phenoxy resins, polycarbonate, polyvinyl butyral, polystyrene, vinyl acetate resins, polysulfone, polyarylate or vinylidene chloride-acrylonitrile copolymers.

The charge transport layer may be formed by dissolving a charge-transporting material and a binder resin in an appropriate solvent, applying the resultant coating liquid and then drying the coating. Examples of the charge-transporting material used may include: triaryl amine compounds, hydrazone compounds, stilbene compounds, pyrazoline compounds, oxazole compounds, thiazole compounds or triaryl methane compounds. As the binder resin, the above-mentioned resins can be used.

The method for applying the photosensitive layer(s) may be: dipping, spray coating, spinner coating, bead coating, blade coating bar coating or beam coating.

In formulating the photosensitive layer, when the photosensitive layer is composed of a single layer, the charge-generating material and the charge-transporting material may preferably be contained in the photosensitive layer in amounts of 2–20 wt. % and 30–80 wt. %, respectively, particularly 2–10 wt. % and 40–70 wt. %, respectively. When the photosensitive layer has a laminated structure, the charge-generating material may preferably be contained in the charge generation layer in an amount of 20–80 wt. %, particularly 50–70 wt. %, and the charge-transporting material may preferably be contained in the charge transport layer in an amount of 30–70 wt. %, particularly 40–60 wt. %.

The thickness of the photosensitive layer which is composed of a single layer may preferably be 5–40 microns, more preferably 10–30 microns. When the photosensitive layer has a laminated structure, the thickness of the charge generation layer may preferably be 0.01–10 microns, more preferably 0.05–5 microns and the thickness of the charge transport layer may preferably be 5–40 microns, more preferably 10–30 microns.

In order to protect the photosensitive layer from external shock, a thin protective layer can be further disposed on the photosensitive layer.

When the oxytitanium phthalocyanine crystal is used as the charge-generating material, it is possible to mix the oxytitanium phthalocyanine crystal with another known charge-generating material as desired. Further, when the fluorene compound is used as the charge-transporting material, it is possible to mix the fluorene compound with another known charge-transporting material as desired.

The electrophotosensitive member according to the present invention can be applied to not only a laser beam printer, a light-emitting diode (LED) printer and a cathode-ray tube (CRT) printer but also an ordinary electrophotographic copying machine, a facsimile machine and other applicable fields of electrophotography.

Figure 12:
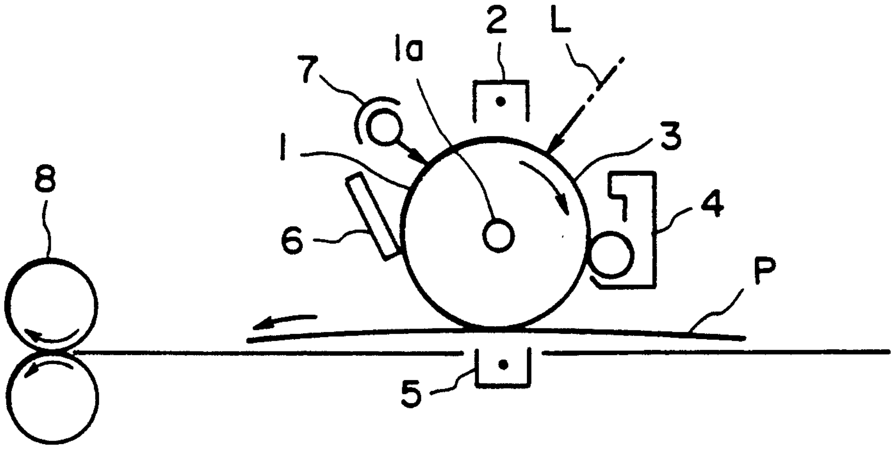
FIG. 12 is a schematic structural view of an electrophotographic apparatus using an electrophotosensitive member according to the invention.

FIG. 12 shows a schematic structural view of an ordinary transfer-type electrophotographic apparatus using an electrophotosensitive member of the invention. Referring to FIG. 12, a photosensitive drum (i.e., photosensitive member) 1 as an image-carrying member is rotated about an axis 1*a* at a prescribed peripheral speed in the direction of the arrow shown inside of the photosensitive drum 1. The surface of the photosensitive drum is uniformly charged by means of a charger 2 to have a prescribed positive or negative potential. The photosensitive drum 1 is exposed to light-image L (as by slit exposure or laser beam-scanning exposure) by using an image exposure means (not shown), whereby an electrostatic latent image corresponding to an exposure image is successively formed on the surface of the photosensitive drum 1. The electrostatic latent image is developed by a developing means 4 to form a toner image. The toner image is successively transferred to a transfer material P which is supplied from a supply part (not shown) to a position between the photosensitive drum 1 and a transfer charger 5 in synchronism with the rotating speed of the photosensitive drum 1, by means of the transfer charger 5. The transfer material P with the toner image thereon is separated from the photosensitive drum 1 to be conveyed to a fixing device 8, followed by image fixing to print out the transfer material P as a copy outside the electrophotographic apparatus. Residual toner particles on the surface of the photosensitive drum 1 after the transfer are removed by means of a cleaner 6 to provide a cleaned surface, and residual charge on the surface of the photosensitive drum 1 is erased by a pre-exposure means 7 to prepare for the next cycle. As the charger 2 for charging the photosensitive drum 1 uniformly, a corona charger is widely used in general. As the transfer charger 5, such a corona charger is also widely used in general.

According to the present invention, in the electrophotographic apparatus, it is possible to provide a device unit which includes plural means inclusive of or selected from the photosensitive member (photosensitive drum), the charger, the developing means, the cleaner, etc. so as to be attached or removed as desired. The device unit may, for example, be composed of the photosensitive member and at least one device of the charger, the developing means and the cleaner to prepare a single unit capable of being attached (or connected) to or removed (or released) from the body of the electrophotographic apparatus by using a guiding means such as a rail in the body. The device unit can be accompanied with the charger and/or the developing means to prepare a single unit.

In a case where the electrophotographic apparatus is used as a copying machine or a printer, exposure light-image L may be given by reading a data on reflection light or transmitted light from an original or on the original, converting the data into a signal and then effecting a laser beam scanning, a drive of LED array or a drive of a liquid crystal shutter array.

Figure 13:
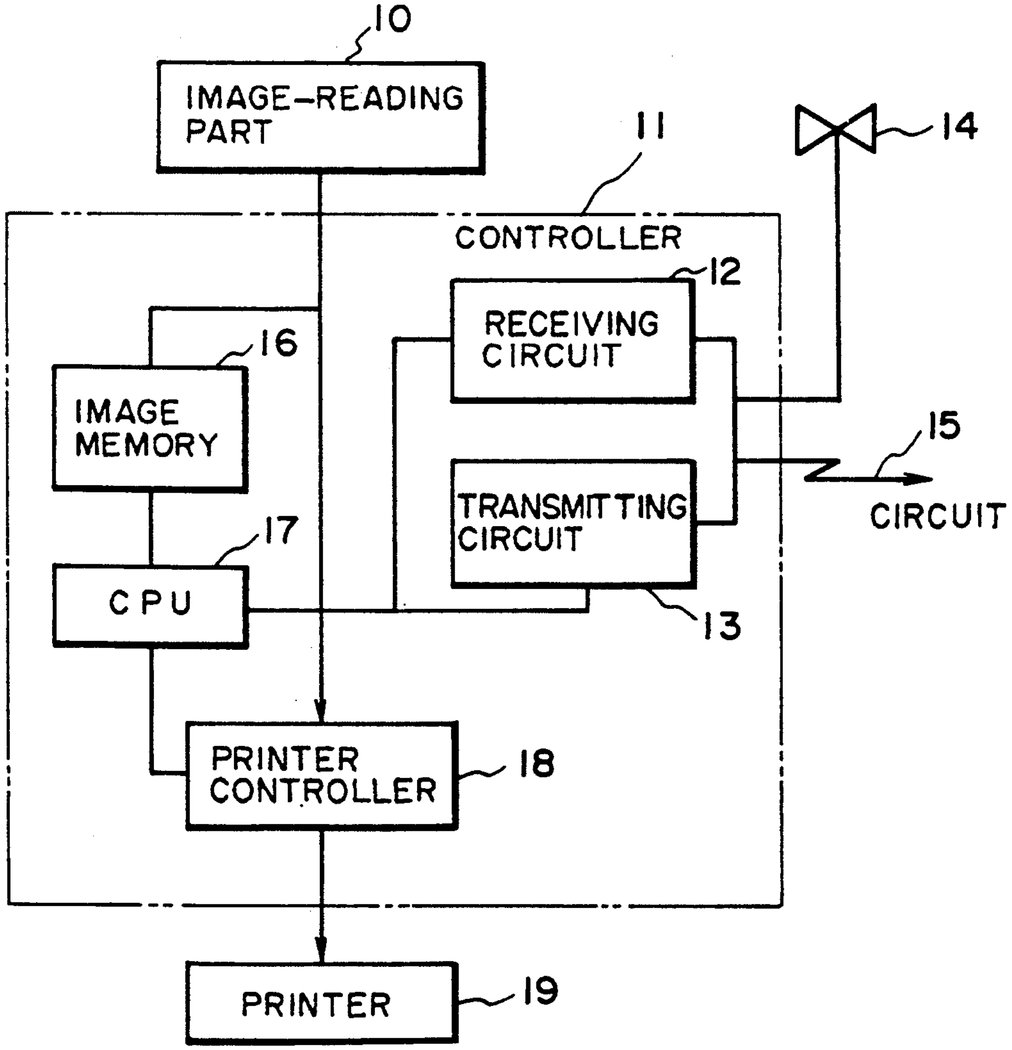
FIG. 13 is a block diagram of a facsimile machine using an electrophotographic apparatus including an electrophotosensitive member according to the invention.

In a case where the electrophotographic apparatus according to the present invention is used as a printer of a facsimile machine, exposure light-image L is given by exposure for printing received data. FIG. 13 shows a block diagram of an embodiment for explaining this case. Referring to FIG. 13, a controller 11 controls an image-reading part 10 and a printer 19. The whole controller 11 is controlled by a CPU (central processing unit) 17. Read data from the image-reading part is transmitted to a partner station through a transmitting circuit 13, and on the other hand, the received data from the partner station is sent to the printer 19 through a receiving circuit 12. An image memory memorizes prescribed image data. A printer controller 18 controls the printer 19, and a reference numeral 14 denotes a telephone.

The image received through a circuit 15 (the image data sent through the circuit from a connected remote terminal) is demodulated by means of the receiving circuit 12 and successively stored in an image memory 16 after a restoring-signal processing of the image data. When image for at least one page is stored in the image memory 16, image recording of the page is effected. The CPU 17 reads out the image data for one page from the image memory 16 and sends the image data for one page subjected to the restoring-signal processing to the printer controller 18. The printer controller 18 receives the image data for one page from the CPU 17 and controls the printer 19 in order to effect image-data recording. Further, the CPU 17 is caused to receive image for a subsequent page during the recording by the printer 19. As described above, the receiving and recording of the image are performed.

Synthesis examples of oxytitanium phthalocyanine crystal used in the present invention will be explained hereinbelow.

SYNTHESIS EXAMPLE 1

In 100 g of α-chloronaphthalene, 5.0 g of o-phthalodinitrile and 2.0 g of titanium tetrachloride were stirred for 3 hours at 200° C., followed by cooling to 50° C. to precipitate a crystal. The crystal was recovered by filtration to obtain a paste of dichlorotitanium phthalocyanine, followed by washing with 100 ml of N,N-dimethylformamide at 100° C. under stirring and two times of washing with 100 ml of methanol at 60° C. The resultant paste was recovered by filtration and stirred in 100 ml of deionized water for 1 hour at 80° C., followed by filtration to obtain 4.3 g of a blue oxytitanium phthalocyanine crystal. The results of elementary analysis are shown below.

| | Elementary analysis ($C_{32}H_{16}N_8OTi$) | | | |
|---|---|---|---|---|
| | C (%) | H (%) | N (%) | Cl (%) |
| Calculated value | 66.68 | 2.80 | 19.44 | 0.00 |
| Observed value | 66.50 | 2.99 | 19.42 | 0.47 |

Figure 7:
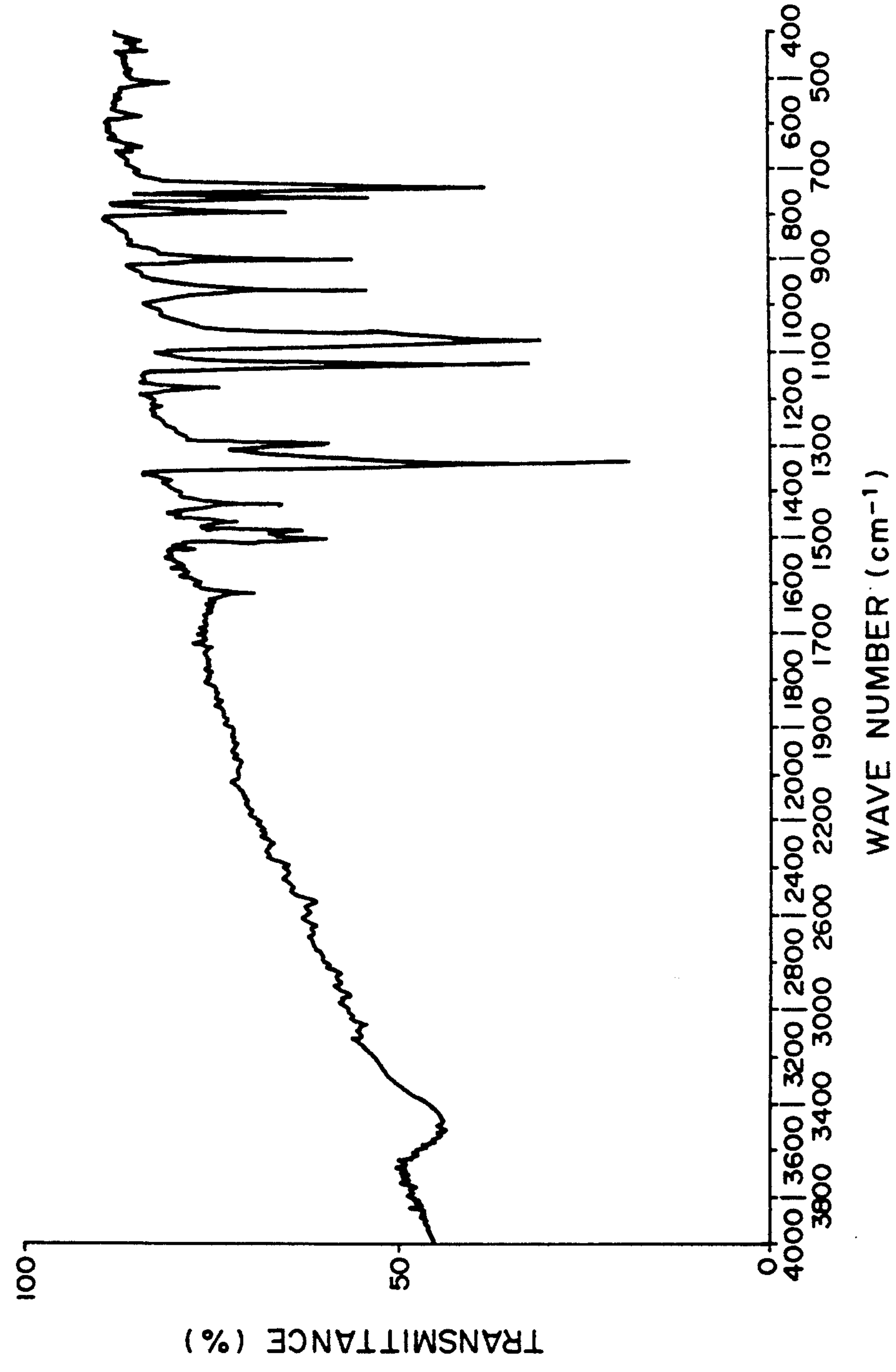
FIG. 7 shows an infrared absorption spectrum (KBr method) of oxytitanium phthalocyanine having a crystal form used in the invention.
Figure 8:
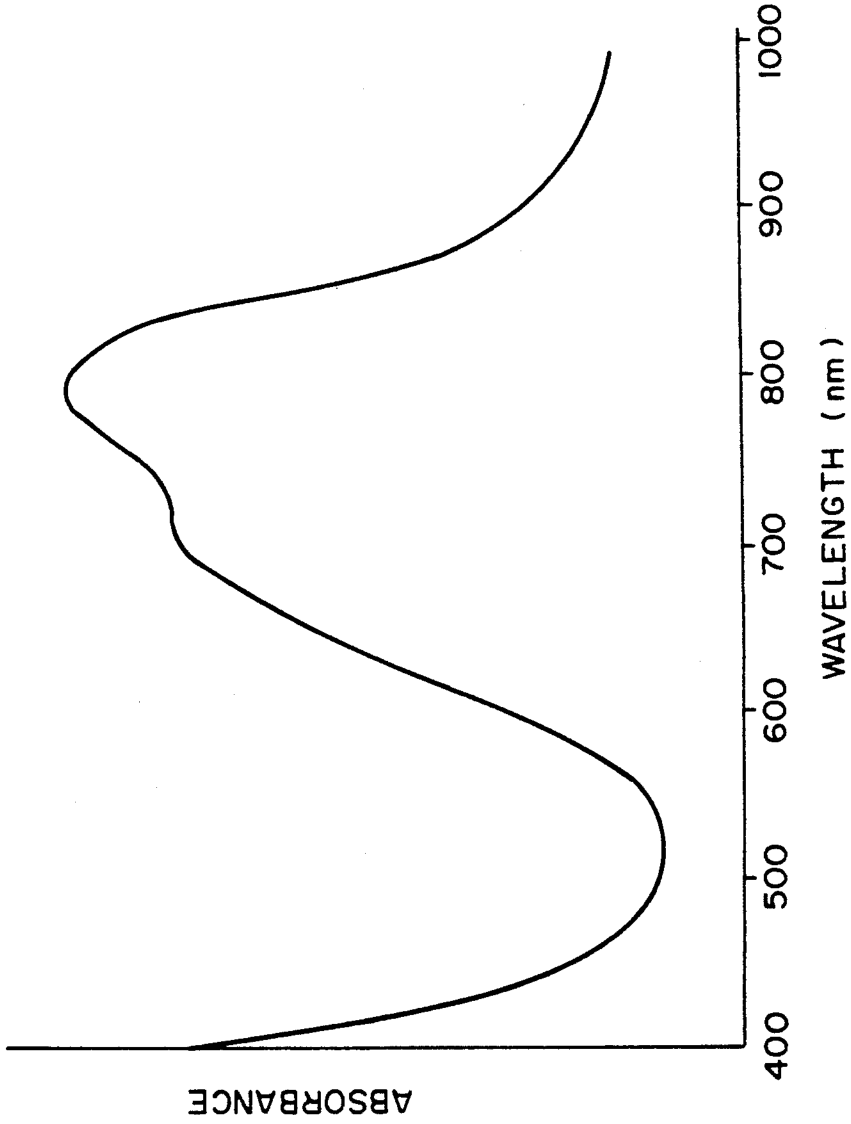
FIG. 8 shows an ultraviolet absorption spectrum of oxytitanium phthalocyanine having a crystal form used in the invention.

The resultant oxytitanium phthalocyanine crystal was dissolved in 150 g of concentrated sulfuric acid and then added dropwise to 1500 ml of deionized water at 20° C. under stirring to reprecipitate a crystal, followed by filtration and sufficient washing with water to obtain amorphous oxytitanium phthalocyanine. The resultant amorphous oxytitanium phthalocyanine in an amount of 4.0 g was subjected to stirring for suspension in 100 ml of methanol for 8 hours at room temperature (22° C.), followed by filtration and drying under reduced pressure to obtain low-crystallized oxytitanium phthalocyanine. To 2.0 g of the resultant low-crystallized oxytitanium phthalocyanine, 40 ml of n-butyl ether was added, followed by milling with glass beads in the size of 1 mm for 20 hours at room temperature (22° C.) to obtain a liquid dispersion. The solid was recovered from the dispersion, followed by washing with methanol, sufficient washing with water and drying to obtain 1.8 g of a novel oxytitanium phthalocyanine crystal of the invention. An X-ray diffraction pattern of the above-prepared oxytitanium phthalocyanine crystal of the invention is shown in FIG. 1. An infrared absorption spectrum measured by using a pellet of the above-prepared oxytitanium phthalocyanine crystal in mixture with KBr is shown in FIG. 7. An ultraviolet absorption spectrum measured by using a dispersion of the above-prepared oxytitanium phthalocyanine crystal in n-butyl ether is shown in FIG. 8.

SYNTHESIS EXAMPLE 2

50 ml of pinene was added to 2.0 g of methanol-treated oxytitanium phthalocyanine prepared in the same manner as in Synthesis Example 1, and then the mixture was milled with glass beads in the size of 1 mm for 20 hours at room temperature (22° C.) to obtain a dispersion. The solid was recovered from the dispersion, followed by washing with methanol, sufficient washing with water and drying to obtain 1.8 g of an oxytitanium phthalocyanine crystal used in the invention. An X-ray diffraction pattern of the above-prepared oxytitanium phthalocyanine crystal is shown in FIG. 2.

SYNTHESIS EXAMPLE 3

To 4.0 g of amorphous oxytitanium phthalocyanine prepared in the same manner as in Synthesis Example 1, 100 ml of methanol was added, followed by boiling for 30 hours under suspension stirring. After the boiling treatment, the suspension was subjected to filtration and drying under reduced pressure to obtain 3.6 g of oxytitanium phthalocyanine. To 2.0 g of the resultant oxytitanium phthalocyanine, 60 ml of ethylene glycol n-butyl ether was added, followed by milling with glass beads in the size of 1 mm for 15 hours at room temperature (22° C.) to obtain a dispersion. The solid was recovered from the dispersion, followed by washing with methanol, sufficient washing with water and drying to obtain 1.8 g of an oxytitanium phthalocyanine crystal used in the invention. An X-ray diffraction pattern of the above-prepared oxytitanium phthalocyanine crystal is shown in FIG. 3.

COMPARATIVE SYNTHESIS EXAMPLE 1

Figure 4:
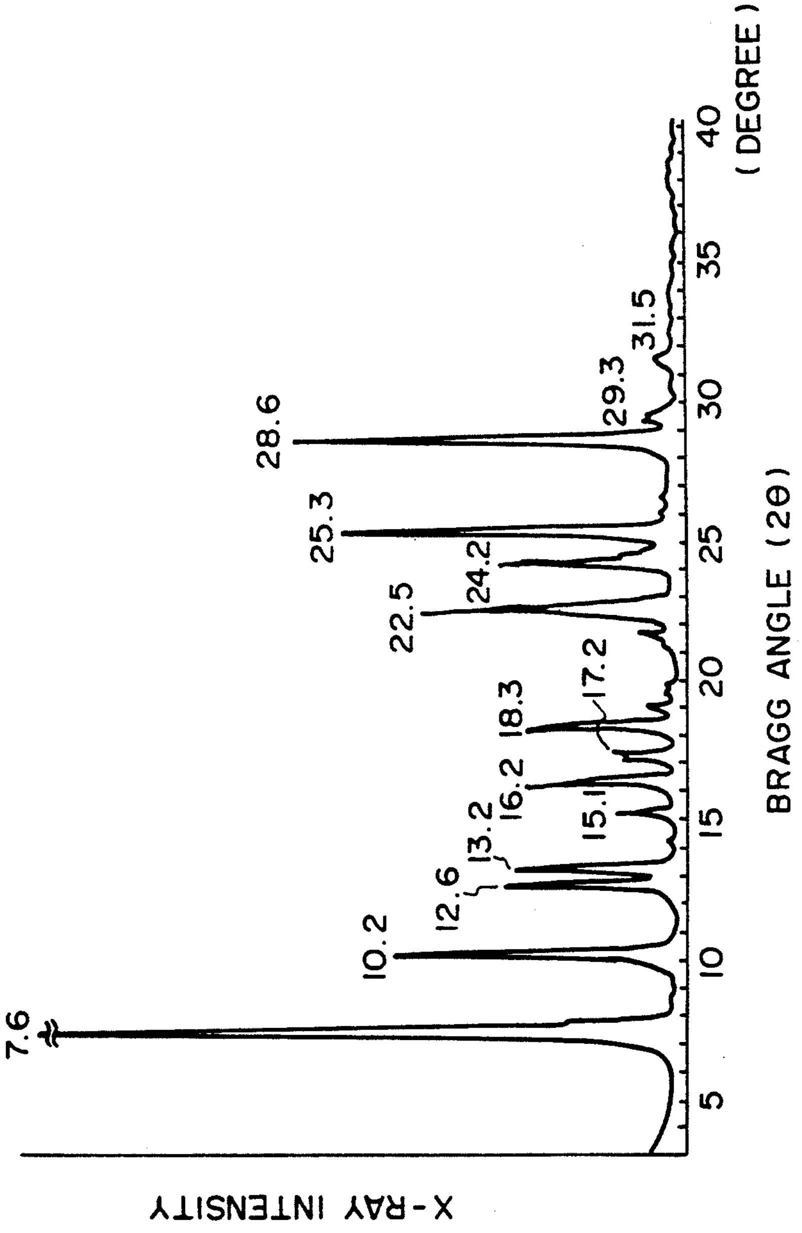
FIGS. 4-6 show X-ray diffraction patterns of three species of oxytitanium phthalocyanine prepared in Comparative Synthesis Examples 1-3, respectively.

A so-called α-type oxytitanium phthalocyanine crystal was synthesized in the same manner as disclosed in Japanese Laid-Open Patent Application (KOKAI) No. 239248/1986 (U.S. Pat. No. 4,728,592). The X-ray diffraction pattern is shown in FIG. 4.

COMPARATIVE SYNTHESIS EXAMPLE 2

Figure 5:
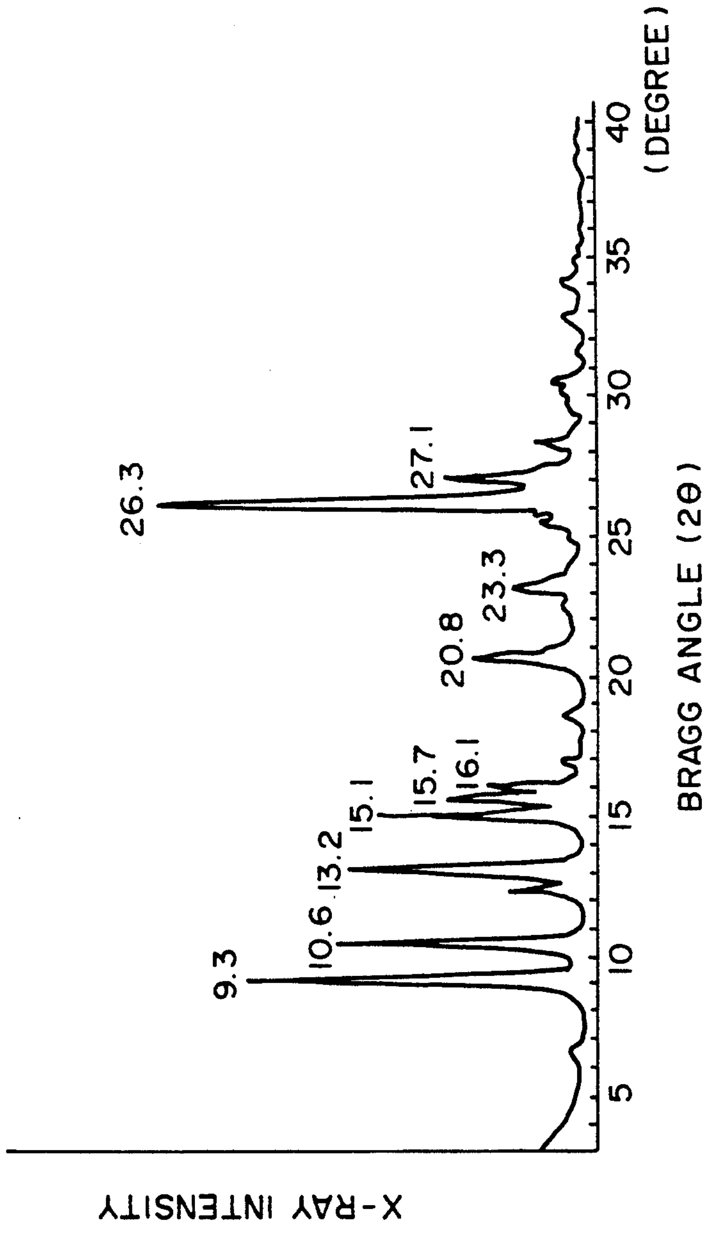

A so-called A-type oxytitanium phthalocyanine crystal was synthesized in the same manner as disclosed in Japanese Laid-Open Patent Application (KOKAI) No. 67094/1987 (U.S. Pat. No. 4,664,997). The X-ray diffraction pattern is shown in FIG. 5.

COMPARATIVE SYNTHESIS EXAMPLE 3

Figure 6:
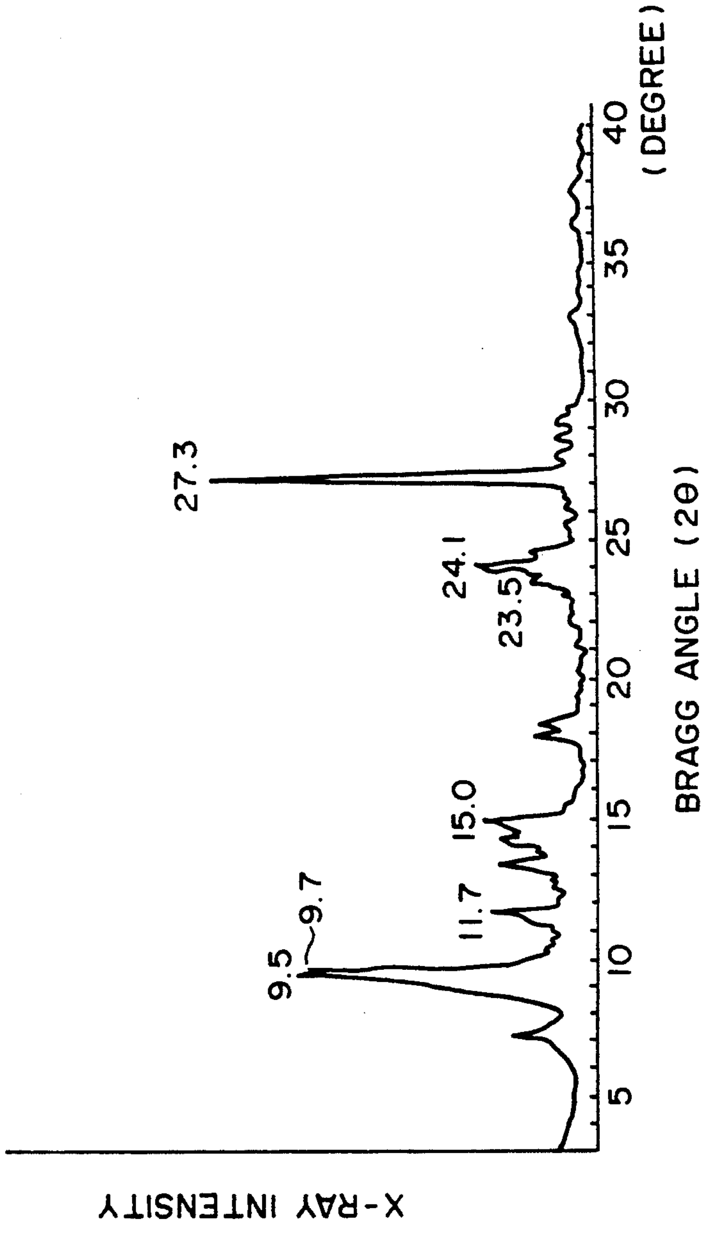

An oxytitanium phthalocyanine crystal was synthesized in the same manner as disclosed in Japanese Laid-Open Patent Application (KOKAI) No. 17066/1989. The X-ray diffraction pattern is shown in FIG. 6.

Herein, the conditions of the X-ray diffraction analysis using CuK characteristic X-rays were as follows:

Measuring machine: X-ray diffraction apparatus manufactured by Rigaku Denki K.K. RAD-A system
X-ray tube (Target): Cu
Tube voltage: 50 KV
Tube current: 40 mA
Scanning method: $2\theta/\theta$ scan
Scanning speed: 2 deg./min.
Sampling width: 0.020 deg.
Starting angle ($2\theta$): 3 deg.
Stopping angle ($2\theta$): 40 deg.
Divergence slit: 0.5 deg.
Scattering slit: 0.5 deg.
Receiving slit: 0.3 mm
Curved monochromator: used.

SYNTHESIS EXAMPLE 4

(Production of Example Compound No. (17))

10 g (31.2 mM) of 2-iodo-9,9-dimethylfluorene, 6.2 g (31.4 mM) of p,p'-ditolylamine, 6.47 g (46.8 mM) of anhydrous potassium carbonate and 4.0 g of copper powder were added to 40 ml of nitrobenzene, followed by stirring for 10 hours at about 200° C. After the reaction mixture was cooled, the reaction mixture was subjected to filtration by suction, and then the nitrobenzene was removed from the resultant filtrate under reduced pressure. The residue was subjected to separation to be purified by using a silica gel column, whereby 8.4 g (Yield: 69.1 %) of the intended compound (Example Compound No. (17)) showing a melting point of 141.0°-141.5° C. was obtained.

Hereinbelow, examples of application of the oxytitanium phthalocyanine crystals and the fluorene compounds used in the invention to electrophotosensitive members will be explained more specifically. Herein, a term "part(s)" denotes "weight part(s)".

EXAMPLE 1

Onto an aluminum plate, a 0.4 micron-thick undercoating layer comprising vinyl chloride-maleic anhydride-vinyl acetate copolymer Mw (weight-average molecular weight)=20,000) was formed.

3.5 parts of an oxytitanium phthalocyanine crystal prepared in the same manner as in Synthesis Example 1 and 2 parts of polyvinyl butyral ("BX-1", mfd. by Sekisui Kagaku K.K.) were dissolved in 95 parts of cyclohexanone, followed by dispersion for 2 hours by means of a sand mill. The resultant dispersion was diluted with 100 parts of methyl ethyl ketone to prepare a coating liquid. The coating liquid was applied onto the undercoating layer by means of a wire bar, followed by drying to form a 0.2 micron-thick charge generation layer. Then, a solution of 5 g of fluorene compound (3) of the formula (I) (i.e., Example Compound No. (3)) and 6 g of a bisphenol Z-type polycarbonate resin ($\overline{M}r,v$ (viscosity-average molecular weight)=35,000) in 65 g of chlorobenzene was applied onto the charge generation layer by means of a wire bar, followed by drying to form a 18 microns-thick charge transport layer to prepare an electrophotographic photosensitive member.

The above-prepared photosensitive member was attached to a cylinder of a laser beam printer (LBP-SX, manufactured by Canon K.K.) which had been modified. The photosensitive member was charged so as to provide −700 V of dark part potential and then exposed to laser light (emission wavelength: 802 nm) to provide −100 V of exposed or light part potential. An exposure quantity EΔ600 (μJ/cm$^2$) required for decreasing the potential from −700 V to −100 V was measured to evaluate the photosensitivity. A residual potential (Vr) was measured after the photosensitive member was further exposed to the laser light so as to be provided with an exposure quantity of 20 (μJ/cm$^2$). The results are shown in Table 1 appearing hereinafter.

Further, the oxytitanium phthalocyanine crystals prepared in Synthesis Examples 2 and 3 were used for providing electrophotosensitive members in the same manner as in the step using the oxytitanium phthalocyanine prepared in Synthesis Example 1. The exposure quantity was measured in the same manner as described above by using each of the photosensitive members, so that a high photosensitivity similar to that of the photosensitive member using the oxytitanium phthalocyanine prepared in Synthesis Example 1 was obtained in each case.

Then, the above-mentioned three photosensitive members were subjected to a copying test (durability test) of 3000 sheets on conditions that: an initial dark part potential and light part potential were set to −700

V and −100 V, respectively, and environmental conditions (relative humidity (%)/temperature (°C.)) were independently set to 10%/50° C. 50%/18° C. and 80%/35° C. The dark part potential and light part potential were measured, and the images before and after the durability test were evaluated. As a result, the three photosensitive members provided good images even after the durability test in any environmental condition described above.

Figure 9:
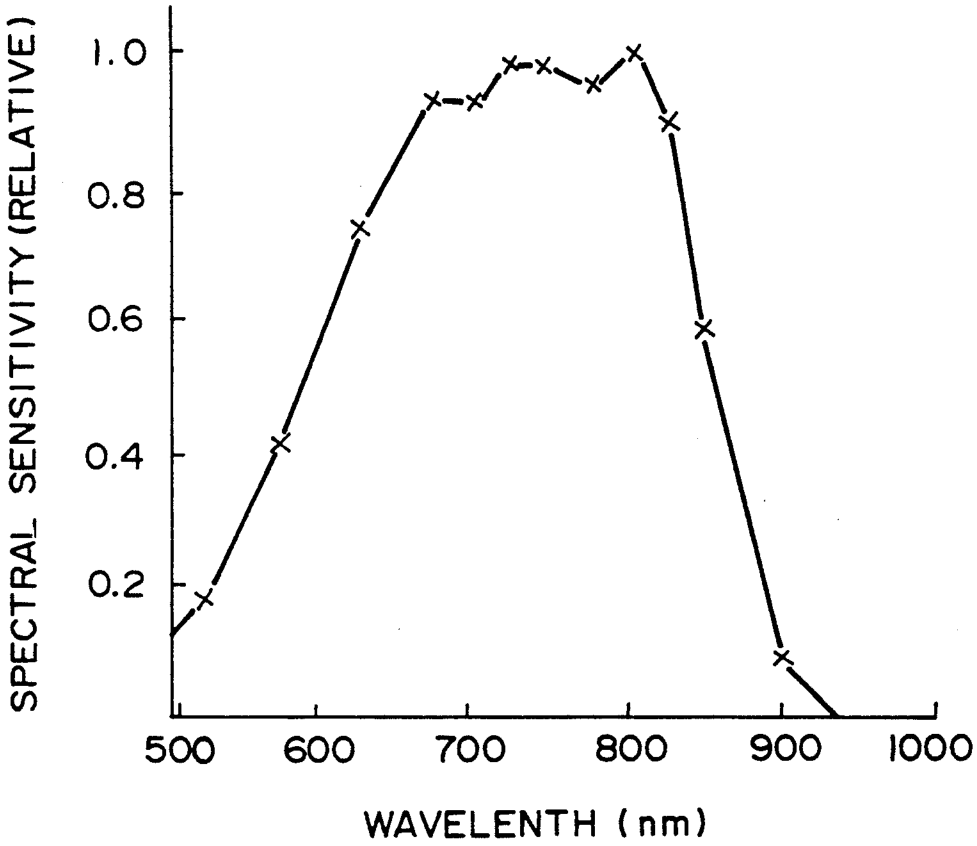
FIG. 9 is a diagram showing spectral sensitivity of an electrophotosensitive member prepared in Example 1.

In FIG. 9, spectral sensitivity of the photosensitive member containing the oxytitaniumphthalocyanine prepared in Synthesis Example 1 and the fluorene compound (3) described above is shown relative to the maximum value of spectral sensitivity which is represented by 1.0. Referring to FIG. 9, the photosensitive member according to the invention showed a stable and high photosensitivity in the long-wavelength region of 770–810 nm.

COMPARATIVE EXAMPLE 1

A photosensitive member was prepared in the same manner as in Example 1 except that the a-type oxytitanium phthalocyanine crystal prepared in Comparative Synthesis Example 1 was used. The results of evaluation of the photosensitivity and residual potential in the same manner as in Example 1 are shown in Table 1 appearing hereinafter.

The above photosensitive member was further subjected to the durability test in the same manner as in Example 1. As a result, the photosensitive member provided images having fog on the white background after the durability test under the above-mentioned three conditions. Particularly, under the condition of 85%/35° C. (relative humidity/temperature), images having remarkable fog on the white background were observed. Further, in order to prevent fog from the white background, the image density was controlled by means of a density control lever, whereby the image density of a black portion became insufficient.

COMPARATIVE EXAMPLE 2

A photosensitive member was prepared in the same manner as in Example 1 except that the A-type oxytitanium phthalocyanine crystal prepared in Comparative Synthesis Example 2 was used. The results of evaluation of the photosensitivity and residual potential in the same manner as in Example 1 are shown in Table 1 appearing hereinafter.

When the photosensitive member was subjected to the durability test in the same manner as in Comparative Example 1, the resultant images having the ground fog similar to Comparative Example 1 were observed. Further, when the image density was controlled in the same manner as in Comparative Example 1, a poor image density in a black portion was obtained.

COMPARATIVE EXAMPLE 3

A photosensitive member was prepared in the same manner as in Example 1 except that the oxytitanium phthalocyanine crystal (disclosed in Japanese Laid-Open Patent Application (KOKAI) No. 17066/1989) prepared in Comparative Synthesis Example 3. The results of evaluation of the photoresistivity and residual potential in the same manner as in Example 1 are shown in Table 1 appearing hereinafter.

When the photosensitive member was subjected to the durability test in the same manner as in Comparative Example 1, the resultant images having remarkable fog on the white background compared with those of Comparative Example 1 were observed.

TABLE 1

| Photosensitive member (Example) | Exposure quantity EΔ600 (μJ/cm²) | Residual potential Vr (−V) |
|---|---|---|
| Example 1 | 0.19 | 10 |
| Comp. Example 1 | 0.84 | 45 |
| Comp. Example 2 | 0.91 | 40 |
| Comp. Example 3 | 0.57 | 35 |

EXAMPLES 2–10

Photosensitive members were prepared and evaluated in the same manner as in Example 1 except that fluorene compounds shown in Table 2 appearing hereinafter were used instead of the fluorene compound (3) (Example Compound (3)), respectively. The results are shown in Table 2 appearing hereinafter.

The above-prepared photosensitive members were independently subjected to a copying test (durability test) of 5,000 sheets on condition that an initial dark part potential and light part potential were set to −700 V and −200 V. The measurement a difference ($=\Delta V_D$) in the dark part potential between the initial stage and a stage after the copying test of 5,000 sheets and a difference ($=\Delta V_L$) in the light part potential between the initial stage and a stage after the copying test was conducted, whereby the results shown in Table 2 were obtained.

TABLE 2

| Photosensitive member (Ex. No.) | Fluorene compound No. | EΔ600 (μJ/cm²) | $\Delta V_D$ (V) | $\Delta V_L$ (V) | Vr (−V) |
|---|---|---|---|---|---|
| 2 | (2) | 0.37 | −15 | +10 | 15 |
| 3 | (9) | 0.34 | −10 | +10 | 15 |
| 4 | (15) | 0.19 | −5 | 0 | 10 |
| 5 | (17) | 0.17 | 0 | 0 | 10 |
| 6 | (20) | 0.18 | 0 | 0 | 5 |
| 7 | (21) | 0.22 | −5 | +5 | 10 |
| 8 | (23) | 0.43 | −15 | +15 | 15 |
| 9 | (35) | 0.40 | −15 | +10 | 15 |
| 10 | (42) | 0.43 | −15 | +15 | 20 |

COMPARATIVE EXAMPLES 4–21

Comparative photosensitive members were prepared and evaluated in the same manner as in Examples 2–10 except that the oxytitanium phthalocyanine crystals prepared in Comparative Synthesis Examples 1–3 were used in combination with the indicated fluorene compounds used in Examples 2–10. The results are shown in Table 3 below.

TABLE 3

| Comparative photosensitive member (Comp. Ex. No.) | Comparative Synthesis Example No. | Fluorene compound No. | EΔ600 (μJ/cm²) | $\Delta V_D$ (V) | $\Delta V_L$ (V) | Vr (−V) |
|---|---|---|---|---|---|---|
| 4 | 1 | (2) | 1.01 | −50 | +35 | 55 |
| 5 | 2 | " | 0.98 | −40 | +35 | 45 |
| 6 | 3 | " | 0.70 | −40 | +30 | 50 |
| 7 | 1 | (17) | 0.85 | −30 | +20 | 45 |
| 8 | 2 | " | 0.90 | −30 | +20 | 40 |
| 9 | 3 | " | 0.59 | −30 | +20 | 30 |
| 10 | 1 | (20) | 0.90 | −20 | +25 | 40 |
| 11 | 2 | " | 0.92 | −20 | +20 | 40 |
| 12 | 3 | " | 0.64 | −30 | +15 | 30 |
| 13 | 1 | (21) | 0.88 | −30 | +20 | 45 |
| 14 | 2 | " | 0.91 | −30 | +25 | 45 |
| 15 | 3 | " | 0.55 | −45 | +20 | 35 |

TABLE 3-continued

| Comparative photosensitive member (Comp. Ex. No.) | Comparative Synthesis Example No. | Fluorene compound No. | EΔ600 (μJ/cm²) | $\Delta V_D$ (V) | $\Delta V_L$ (V) | Vr (−V) |
|---|---|---|---|---|---|---|
| 16 | 1 | (35) | 1.01 | −50 | +45 | 55 |
| 17 | 2 | " | 0.97 | −50 | +40 | 50 |
| 18 | 3 | " | 0.67 | −50 | +40 | 45 |
| 19 | 1 | (42) | 0.98 | −70 | +40 | 35 |
| 20 | 2 | " | 1.04 | −50 | +45 | 30 |
| 21 | 3 | " | 0.70 | −40 | +60 | 30 |

COMPARATIVE EXAMPLES 22-27

Comparative photosensitive members were prepared and evaluated in the same manner as in Examples 2-10 except that the following fluorene compounds H-1-H-6 used as charge transporting materials were used instead of those of Examples 2-10.

H-1

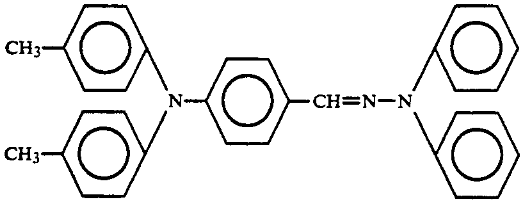

H-2

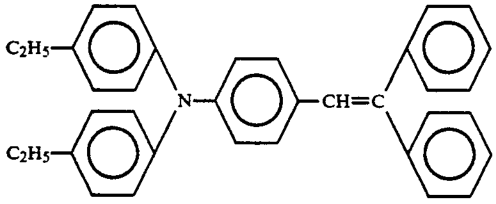

H-3

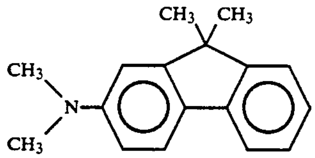

H-4

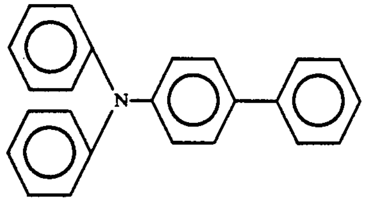

H-5

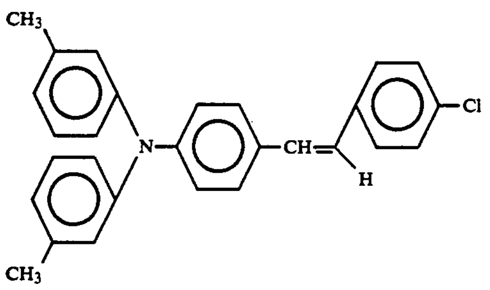

-continued

H-6

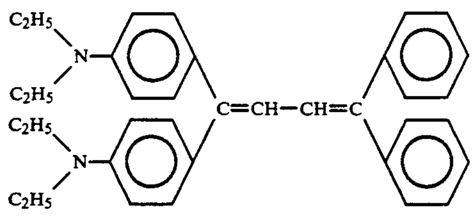

The results are shown in Table 4 below.

TABLE 4

| Comparative photosensitive member (Comp. Ex. No.) | Charge transporting material (Fluorene compound No.) | EΔ600 (μJ/cm²) | $\Delta V_D$ (V) | $\Delta V_L$ (V) | Vr (−V) |
|---|---|---|---|---|---|
| 22 | H-1 | 0.40 | −40 | +40 | 55 |
| 23 | H-2 | 0.49 | −65 | +45 | 50 |
| 24 | H-3 | 0.74 | −40 | +35 | 45 |
| 25 | H-4 | 0.60 | −35 | +35 | 60 |
| 26 | H-5 | 0.54 | −50 | +40 | 55 |
| 27 | H-6 | 0.59 | −30 | +50 | 70 |

As is apparent from the results shown in Tables 2-4, the photosensitive member containing oxytitanium phthalocyanine having a specific crystal form and a fluorene compound of the formula (I) according to the present invention provided excellent electrophotographic characteristics such as high photosensitivity, decreased residual potential and stable dark part potential and dark part potential in the durability test.

EXAMPLE 11

On a 50 micron-thick aluminum sheet substrate, an undercoating layer similar to the one in Example 1 was formed, and a 20 micron-thick charge transport layer similar to the one in Example 1 was further formed thereon. Separately, 3 parts of the oxytitanium phthalocyanine crystal prepared in the same manner as in Synthesis Example 1 was mixed with a solution of 5 parts of a bisphenol Z-type polycarbonate resin (Mw=20,000) in 60 parts of cyclohexane and were dispersed for 1 hour by means of a sand mill. To the resultant dispersing liquid, 5 parts of a bisphenol Z-type polycarbonate resin (Mw=20,000) and 10 parts of the charge-transporting material used in Example 1, followed by dilution with 40 parts of tetrahydrofuran and 40 parts of dichloromethane to provide a dispersion paint. The resultant paint was applied onto the above-prepared charge transport layer by spray coating, followed by drying the resultant coating to form a 6 micron-thick charge generation layer, whereby a photosensitive member was prepared.

COMPARATIVE EXAMPLE 28

A photosensitive member was prepared in the same manner as in Example 11 except that the α-type oxytitanium phthalocyanine crystal prepared in Comparative Synthesis Example 1 was used.

COMPARATIVE EXAMPLE 29

A photosensitive member was prepared in the same manner as in Example 11 except that the A-type oxytitanium phthalocyanine crystal prepared in Comparative Synthesis Example 2 was used.

COMPARATIVE EXAMPLE 30

A photosensitive member was prepared in the same manner as in Example 11 except that the oxytitanium phthalocyanine crystal (disclosed in Japanese Laid-Open Patent Application (KOKAI) No. 17066/1989) prepared in Comparative Synthesis Example 3.

The above-prepared four electrophotosensitive members prepared in Example 11 and Comparative Examples 28–30 were subjected to evaluation of photosensitivity by means of an electrostatic testing apparatus (EPA-8100, manufactured by Kawaguchi Denki K.K.). Each electrophotosensitive member was charged so as to provide 700 V (positive) of surface potential by corona charging and was exposed to monochromatic light (emission wavelength: 802 nm) isolated by means of a monochromator to provide 200 V (positive) of surface potential. The exposure quantity ($\mu J/cm^2$) required for decreasing the potential from 700 V to 200 V was measured to provide the results shown in Table 5 below.

TABLE 5

| Photosensitive member (Example) | Exposure quantity ($\mu J/cm^2$) |
|---|---|
| Example 11 | 0.36 |
| Comparative Example 28 | 1.10 |
| Comparative Example 29 | 1.08 |
| Comparative Example 30 | 0.84 |

EXAMPLE 12

Onto an aluminum plate, a solution of 5 g of an N-methoxymethylated 6-nylon resin (Mw=50,000) and 10 g of an alcohol-soluble copolymer nylon resin (Mw=50,000) in 95 g of methanol was applied by means of a wire bar, followed by drying to form a 1 micron-thick undercoating layer.

Separately, 10 g of oxytitanium phthalocyanine prepared in the same manner as in Synthesis Example 1, 5 g of polyvinyl butyral (butyral degree=65 %, Mw=45,000) and 200 g of dioxane were dispersed for 15 hours in a ball mill. The liquid dispersion was applied onto the undercoating layer by using a blade coating method, followed by drying to form a 0.2 micron-thick charge generation layer.

Then, 10 g of a fluorene compound (17) (Example Compound No. 17) and 10 g of polymethyl methacrylate (Mw=70,000) were dissolved in 80 g of monochlorobenzene. The solution was applied onto the charge generation layer by blade coating and dried to form a 16 microns-thick charge transport layer to prepare a photosensitive member.

The thus prepared photosensitive member was charged by using corona discharge (−5 KV) so as to have an initial potential of $V_0$, left standing in a dark place for 1 sec, and thereafter the surface potential thereof ($V_1$) was measured. In order to evaluate the sensitivity, the exposure quantity ($E_{1/6}$, $\mu J/cm^2$) required for decreasing the potential $V_1$ after the dark decay to 1/6 thereof was measured. The light source used herein was laser light (output: 5 mW, emission wavelength: 680 nm) emitted from a quaternary semiconductor comprising indium/gallium/aluminum/phosphorus.

The results were as follows:

$V_0$: −685 V $V_1$: −680 V $E_{1/6}$: 0.46 $\mu J/cm^2$

The above-mentioned photosensitive member was assembled in a laser beam printer (trade name: LBP-SX, mfd. by Canon K.K.) as an electrophotographic printer equipped with the above-mentioned semiconductor laser using a reversal development system, and subjected to actual image formation.

The image formation conditions used herein were as follows:

surface potential after primary charging: −700 V surface potential after image exposure: −150 V (exposure quantity: 1.8 $\mu J/cm^2$)

transfer potential: +700 V polarity of developer: negative process speed: 50 mm/sec developing condition (developing bias): −450 V image exposure scanning system: image scan exposure prior to the primary charging: 50 lux.sec (whole surface exposure using red light)

The image formation was effected by line-scanning the laser beam corresponding to character and image signals. As a result, good prints were obtained with respect to the characters and images Further, when successive image formation of 5,000 sheets was conducted, good prints were stably obtained from the initial stage to 5,000 sheets.

What is claimed is:

1. An electrophotographic photosensitive member, comprising: an electroconductive support and a photosensitive layer disposed on the electroconductive support, wherein the photosensitive layer comprises (i) oxytitanium phthalocyanine having a crystal form characterized by main peaks specified by Bragg angles (2θ±0.2 degree) of 9.0 degrees, 14.2 degrees, 23.9 degrees and 27.1 degrees in X-ray diffraction pattern based on CuKα characteristic X-rays, and (ii) a fluorene compound represented by the following formula (I):

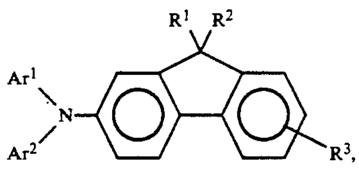

(I)

wherein $Ar^1$ and $Ar^2$ independently denote aryl group optionally having a substituent; $R^1$ and $R^2$ independently denote alkyl group optionally having a substituent, aralkyl group optionally having a substituent or aryl group optionally having a substituent; and $R^3$ denotes hydrogen atom, alkyl group optionally having a substituent, alkoxy group optionally having a substituent, hydroxyl group or halogen atom.

2. A photosensitive member according to claim 1, wherein $Ar^1$ and $Ar^2$ independently denote 4-methylphenyl group.

3. A photosensitive member according to claim 1, wherein $R^1$ and $R^2$ independently denote methyl group or ethyl group.

4. A photosensitive member according to claim 1, herein $Ar^1$ and $Ar^2$ independently denote 4-methylphenyl group and $R^1$ and $R^2$ independently denote methyl group or ethyl group.

5. A photosensitive member according to claim 1, wherein the photosensitive layer includes a charge generation layer and a charge transport layer.

6. A photosensitive member according to claim 5, wherein the charge generation layer comprises the oxytitanium phthalocyanine.

7. A photosensitive member according to claim 5, wherein the charge transport layer comprises the fluorene compound represented by the formula (I).

8. A photosensitive member according to claim 5, wherein the charge generation layer comprises the oxytitanium phthalocyanine; and the charge transport layer comprises the fluorene compound represented by the formula (I).

9. A photosensitive member according to claim 5, comprising the electroconductive support, the charge generation layer and the charge transport layer in this order.

10. A photosensitive member according to claim 5, comprising the electroconductive support, the charge transport layer and the charge generation layer in this order.

11. A photosensitive member according to claim 1, comprising an undercoating layer between the electroconductive support and the photosensitive layer.

12. A photosensitive member according to claim 1, comprising a protective layer on the photosensitive layer.

13. An electrophotographic apparatus, including: an electrophotographic photosensitive member according to claim 1, means for forming an electrostatic latent image, means for developing the formed electrostatic latent image and means for transferring the developed image to a transfer-receiving material.

14. A device unit, including: an electrophotographic photosensitive member according to claim 1, a charging means and a cleaning means;

wherein the photosensitive member, the charging means and the cleaning means are integrally supported to form a single unit, which can be connected to or released from an apparatus body as desired.

15. A device unit according to claim 14, further including a developing means.

16. A facsimile machine, comprising: an electrophotographic apparatus and means for receiving image data from a remote terminal, the electrophotographic apparatus including an electrophotographic photosensitive member according to claim 1.

* * * * *